United States Patent
Lee et al.

(10) Patent No.: US 12,521,384 B2
(45) Date of Patent: Jan. 13, 2026

(54) DRUG DELIVERY COMPOSITION USING CROSSLINKED HYALURONIC ACID AND MANUFACTURING METHOD THEREFOR

(71) Applicant: JP cares, Seongnam-si (KR)

(72) Inventors: Yungee Lee, Gwangju-si (KR); Minyong Choi, Seoul (KR); Songyi Han, Seongnam-si (KR); Myeong Hee Lee, Seoul (KR)

(73) Assignee: JP CARES, Seongnam-si (KR)

( * ) Notice: Subject to any disclaimer, the term of this patent is extended or adjusted under 35 U.S.C. 154(b) by 686 days.

(21) Appl. No.: 17/799,402

(22) PCT Filed: Oct. 28, 2020

(86) PCT No.: PCT/KR2020/014829
§ 371 (c)(1),
(2) Date: Aug. 12, 2022

(87) PCT Pub. No.: WO2021/172694
PCT Pub. Date: Sep. 2, 2021

(65) Prior Publication Data
US 2023/0338353 A1    Oct. 26, 2023

(30) Foreign Application Priority Data
Feb. 26, 2020 (KR) .......... 10-2020-0023763

(51) Int. Cl.
*A61K 31/445* (2006.01)
*A61K 9/06* (2006.01)
*A61K 31/167* (2006.01)
*A61K 47/36* (2006.01)

(52) U.S. Cl.
CPC .............. *A61K 31/445* (2013.01); *A61K 9/06* (2013.01); *A61K 31/167* (2013.01); *A61K 47/36* (2013.01)

(58) Field of Classification Search
None
See application file for complete search history.

(56) References Cited

U.S. PATENT DOCUMENTS

| 2005/0281880 A1 | 12/2005 | Wang |
| 2018/0344896 A1 | 12/2018 | Jung et al. |
| 2019/0374457 A1 | 12/2019 | Lee et al. |

FOREIGN PATENT DOCUMENTS

| JP | 2016-524016 | 8/2016 |
| JP | 2018-510041 | 4/2018 |
| JP | 2020-512061 | 4/2020 |
| KR | 10-2005-0085736 | 8/2005 |
| KR | 10-0990301 | 10/2010 |
| KR | 10-2011-0043730 | 4/2011 |
| KR | 10-1103423 | 1/2012 |
| KR | 10-1374271 | 3/2014 |
| KR | 10-1379380 | 4/2014 |
| KR | 10-2016-0027095 | 3/2016 |
| KR | 10-1620090 | 5/2016 |
| KR | 10-2016-0096205 | 8/2016 |
| KR | 10-2016-0100265 | 8/2016 |
| KR | 10-1660211 | 9/2016 |
| KR | 10-1692782 | 1/2017 |
| KR | 10-1769739 | 8/2017 |
| KR | 10-2018-0014042 | 2/2018 |
| KR | 10-1834588 | 3/2018 |
| KR | 10-1902956 | 10/2018 |
| KR | 10-2019-0103559 | 9/2019 |
| WO | 2019-155391 | 8/2019 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Li, Designing hydrogels for controlled drug delivery, Nature Review Materials, Dec. 1, 2016, p. 1-8 which teaches significance of swelling in hydrogel based drug delivery. See Figurers 1-4.*
EPO, Search Report of EP 20921761.1 dated Mar. 15, 2024.
A. Franck et al., "Viscoelasticity and dynamic mechanical testing", Mar. 19, 2023, URL: https://www.tainstruments.com/pdf/literature/AAN004_Viscoelasticity_and_DMA.pdf, XP93135513.
Unknown, "Wikipedia: Elastic Modulus", doi:1, Oct. 28, 2023, URL: https://en.wikipedia.org/wiki/Elastic_modulus, [retrieved on Feb. 27, 2024], XP093135284.
Unknown, "Wikipedia: Dynamic Modulus", Feb. 22, 2024, URL: https://en.wikipedia.org/wiki/Dynamic_modulus, XP093135540.
KIPO, PCT Search Report & Written Opinion of PCT/KR2020/014829 dated Feb. 15, 2021.
Li, Jianyu et al., "Designing hydrogels for controlled drug delivery", Nature Reviews Materials, 2016, Article No. 16071, pp. 1-17, Oct. 18, 2016.
Agrawal, Anuja et al., "Swelling and drug release kinetics of composite wound dressing", India Journal of Fibre & Textile Research, 2018, pp. 104-111.
Youngkyu Lee, M.D. et al., "The Anesthetic Effect of Modified Subcutaneous Single-Injection Digital Block", Department of Emergency Medicine, Ajou University School of Medicine, vol. 27, No. 4, Aug. 2016.

\* cited by examiner

*Primary Examiner* — Nizal S Chandrakumar
(74) *Attorney, Agent, or Firm* — LEX IP MEISTER, PLLC

(57) ABSTRACT

The present invention relates to a drug delivery composition using crosslinked hyaluronic acid, a manufacturing method therefor, and a pharmaceutical composition comprising the drug delivery composition and a drug and having a desired release behavior.

7 Claims, 10 Drawing Sheets

[FIG. 1]
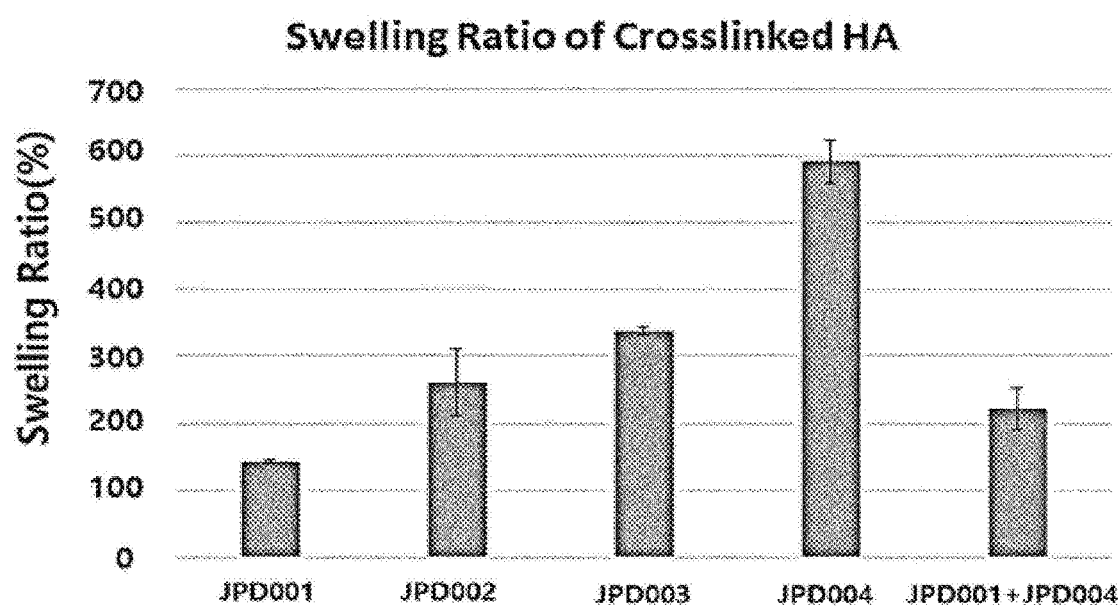

[FIG. 2]
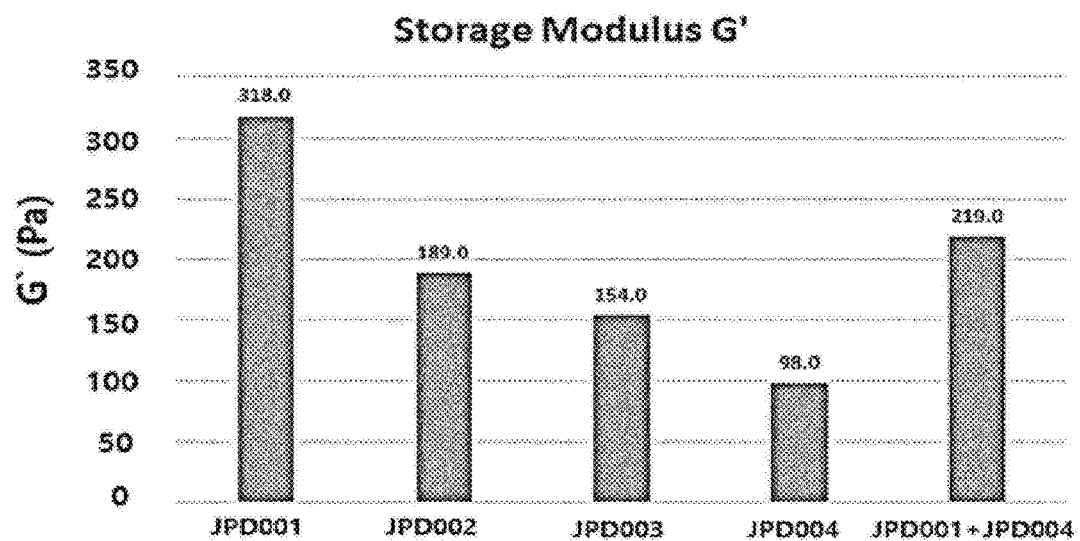
[FIG. 3]
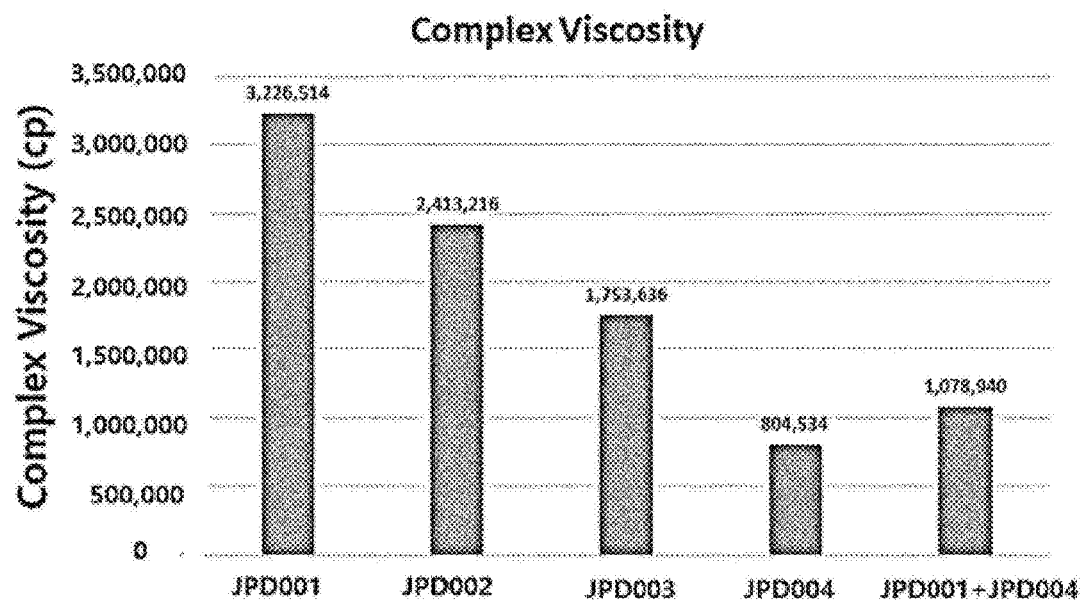

【FIG. 4】
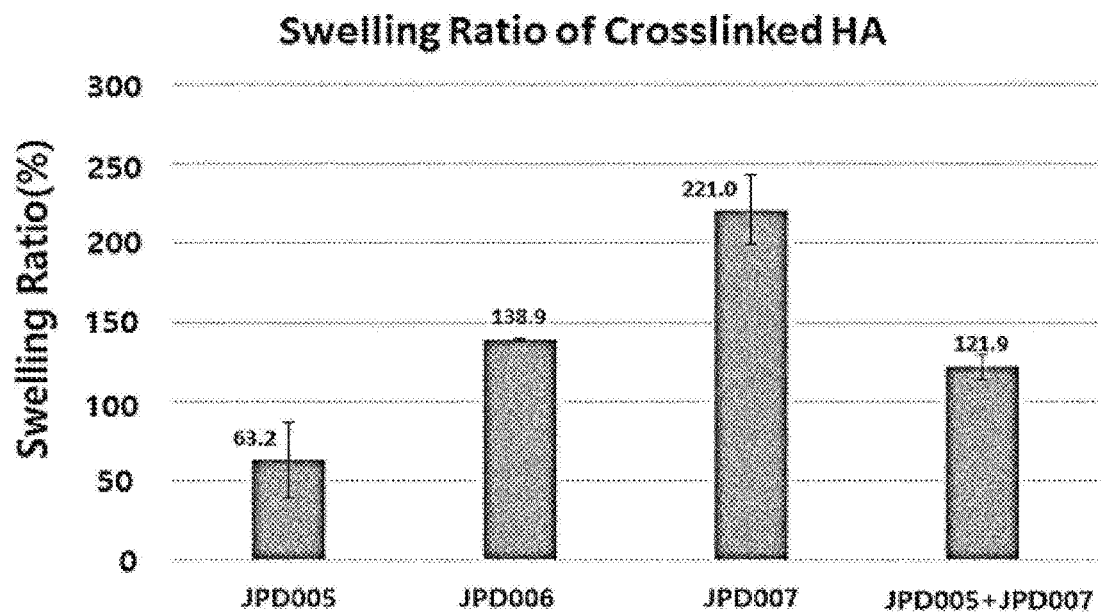
【FIG. 5】
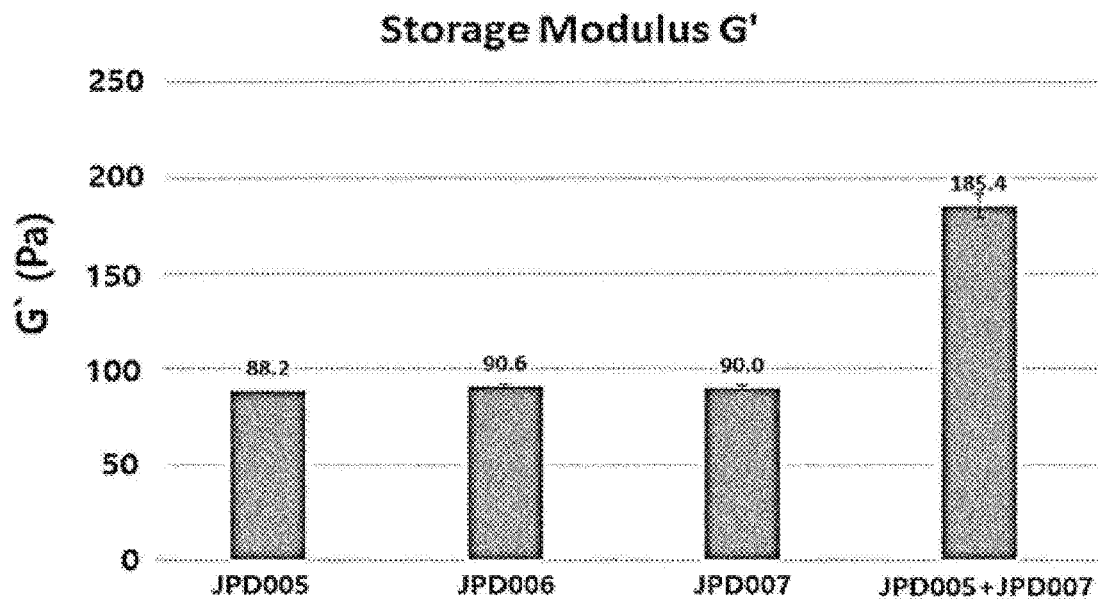

[FIG. 6]
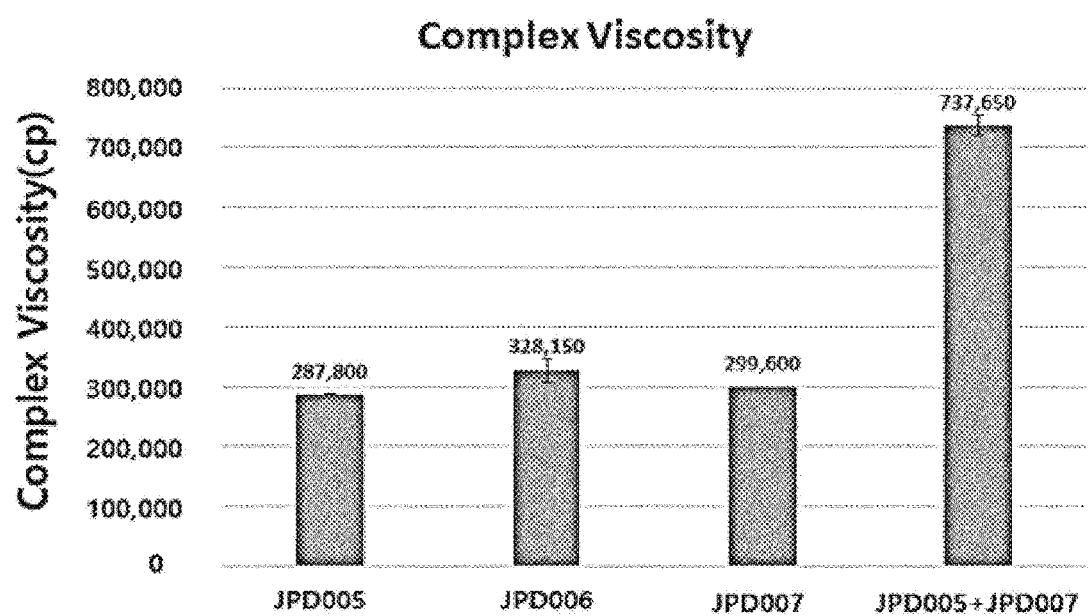

[FIG. 7]
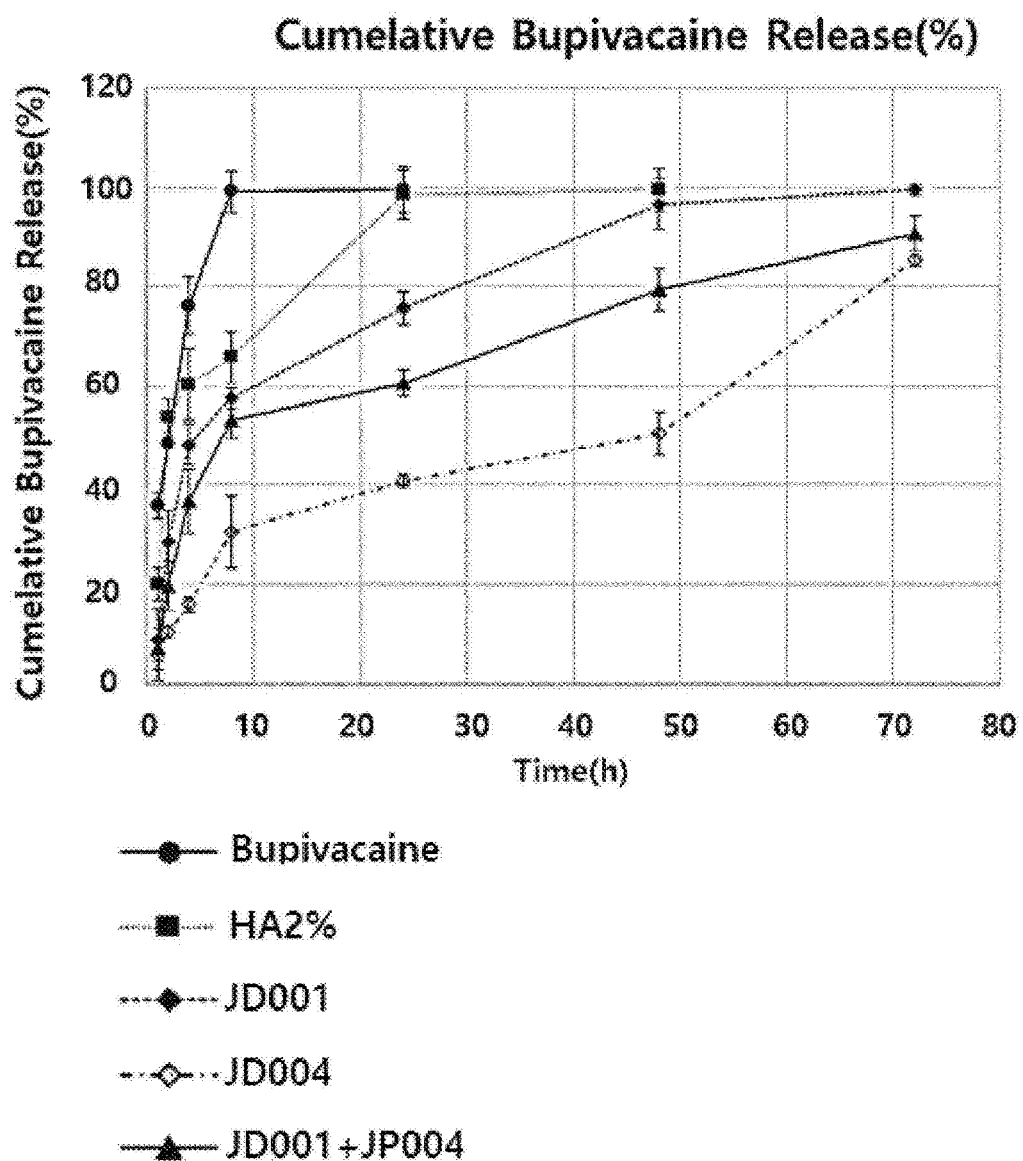

【FIG. 8】
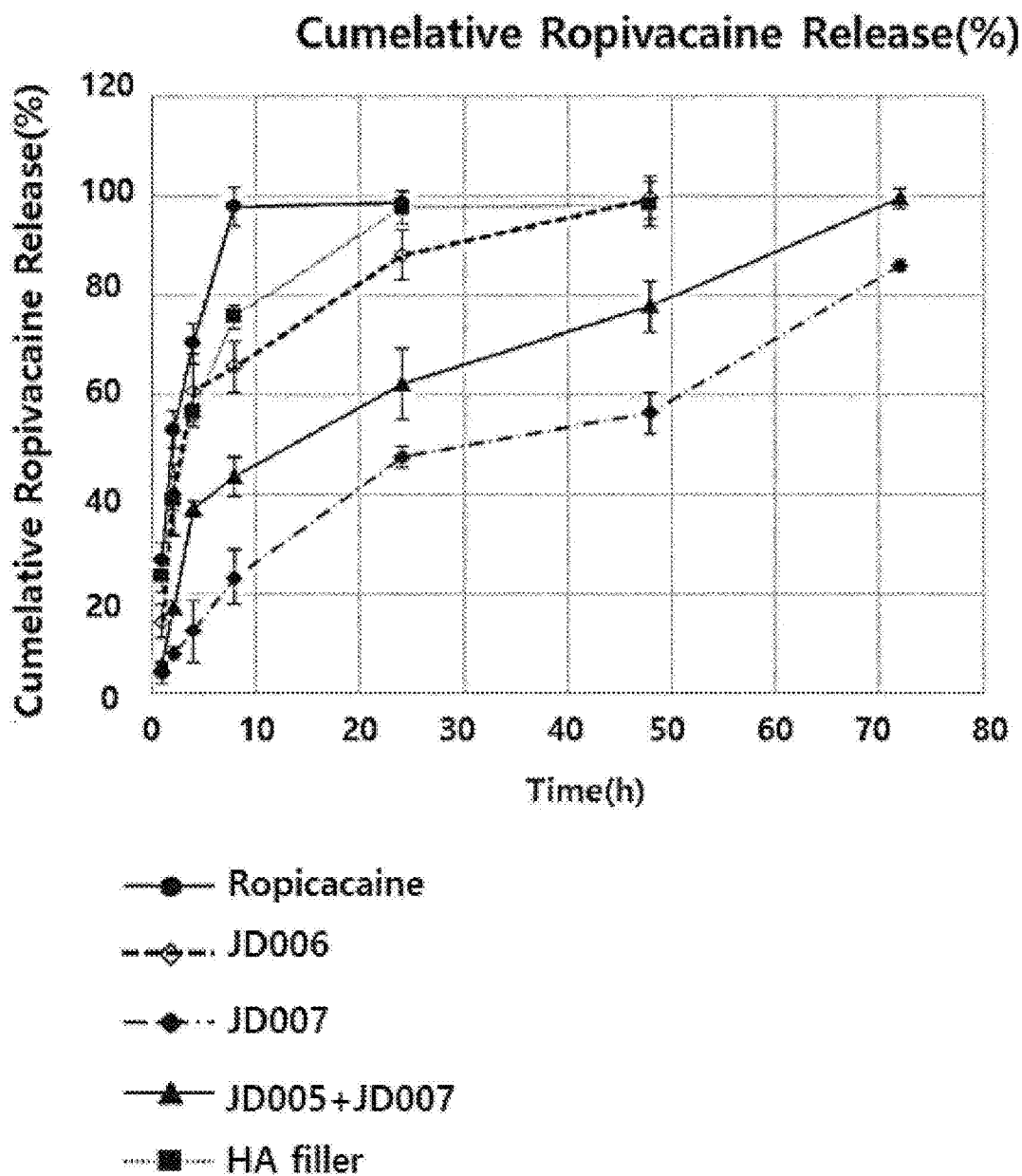

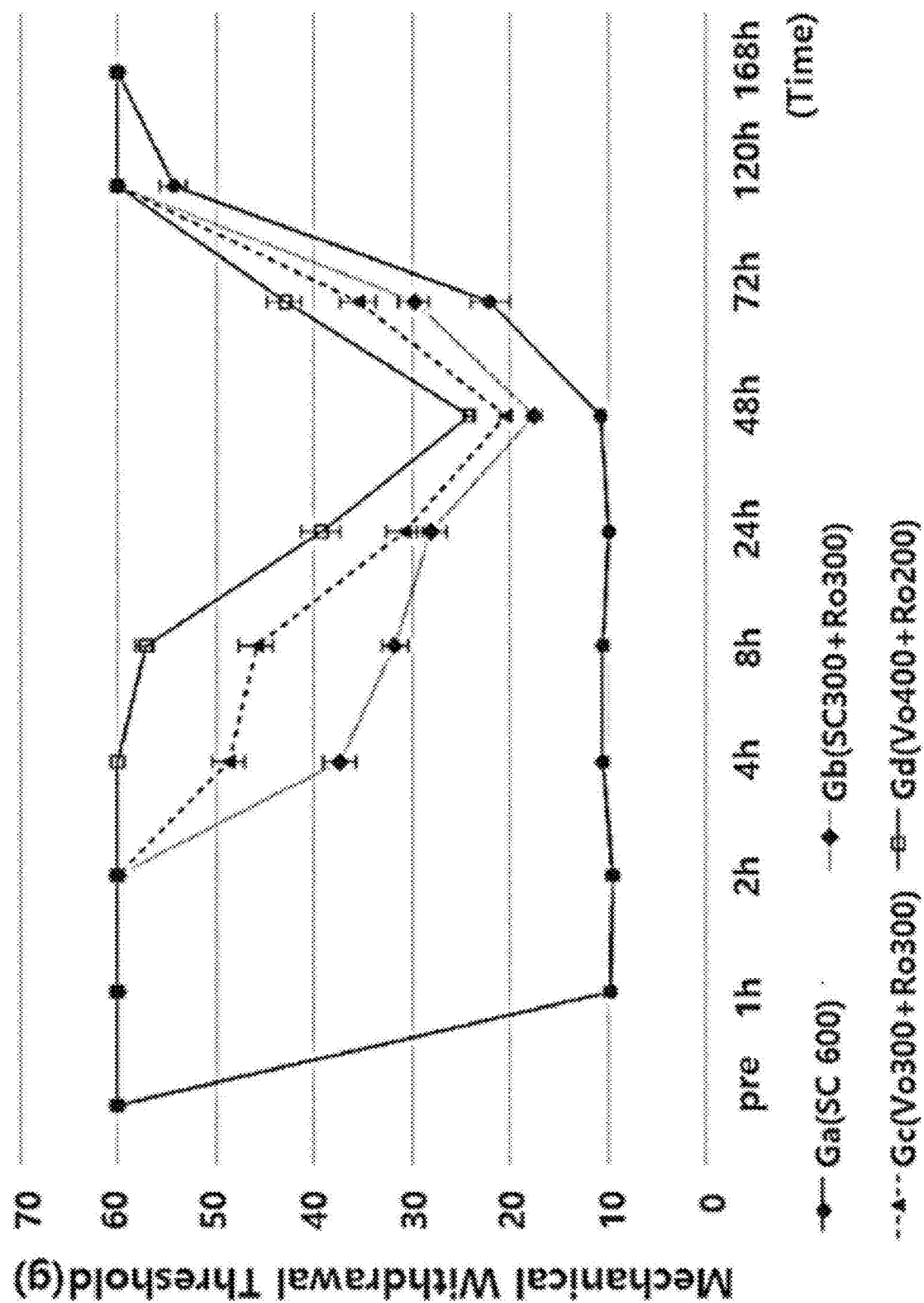

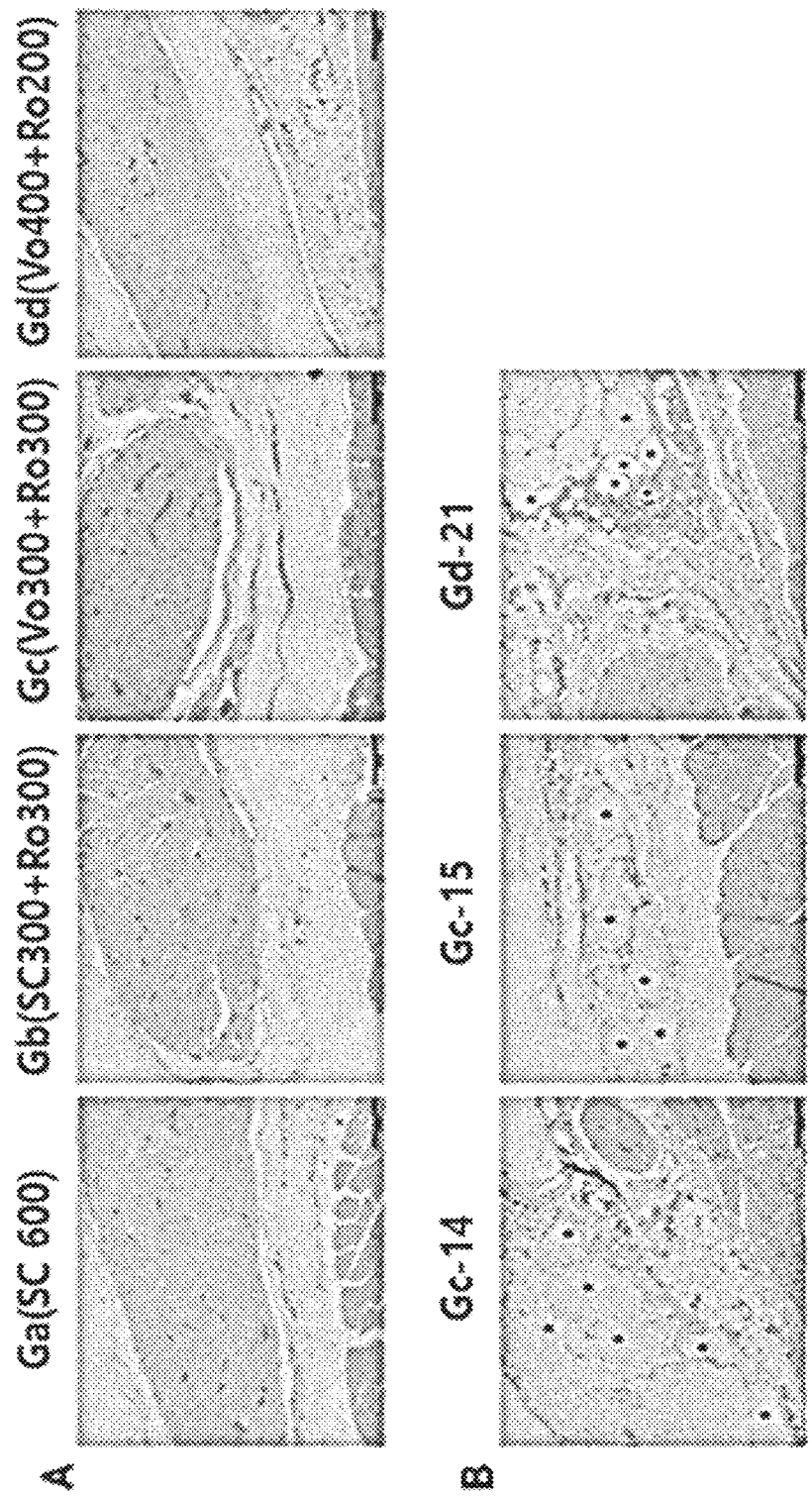
[FIG. 10]

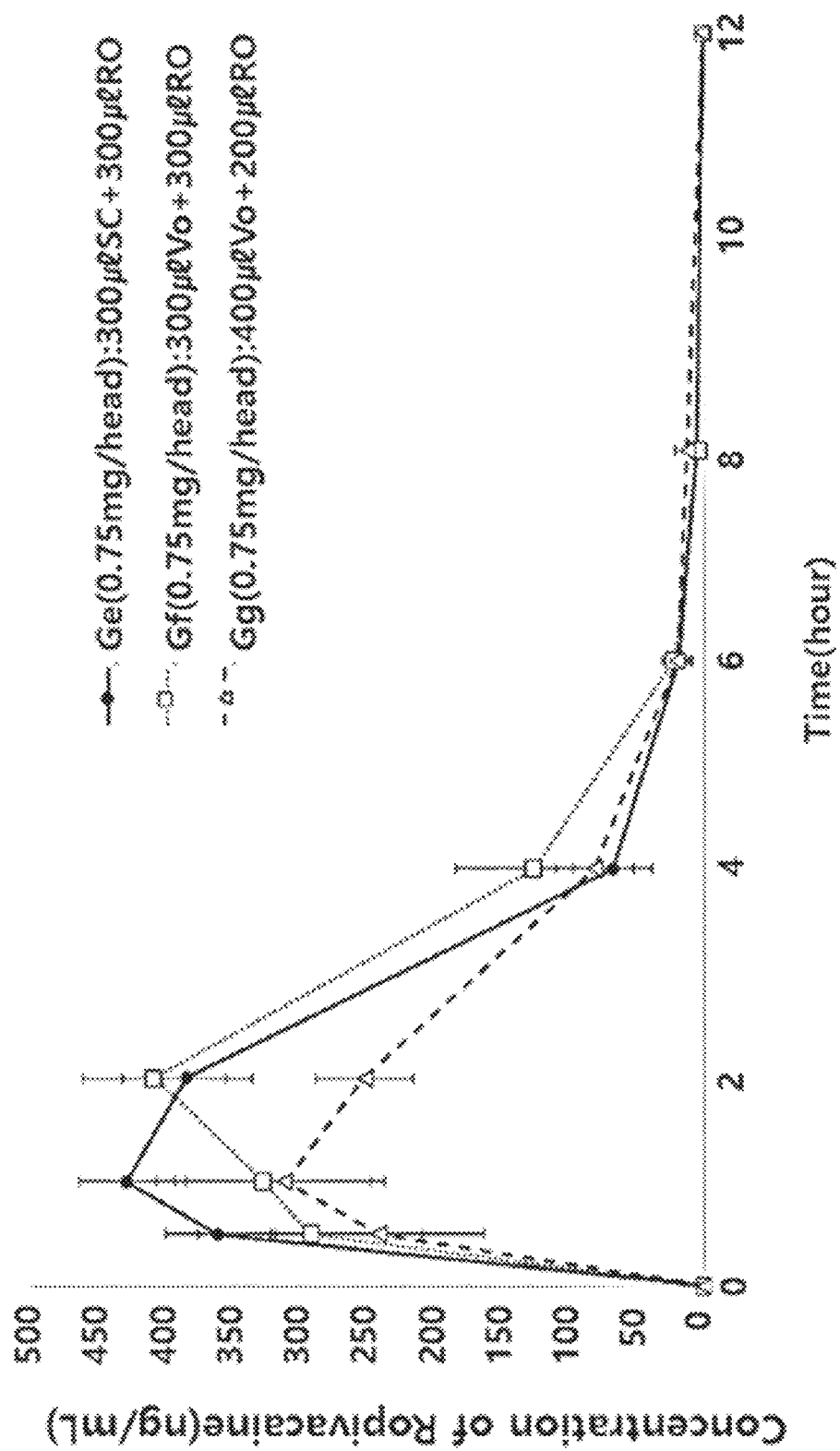
[FIG. 11]

[FIG. 12]
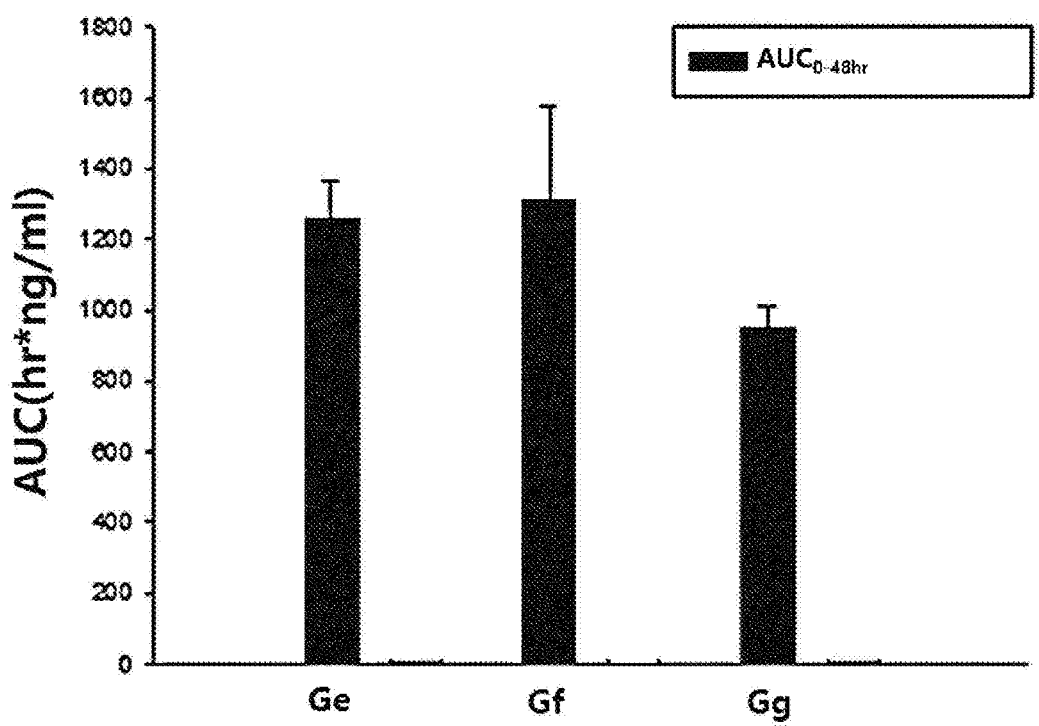

DRUG DELIVERY COMPOSITION USING CROSSLINKED HYALURONIC ACID AND MANUFACTURING METHOD THEREFOR

TECHNICAL FIELD

The present invention relates to a drug delivery composition using a crosslinked hyaluronic acid and a method for preparation thereof, and comprises the drug delivery composition and a drug.

BACKGROUND ART

Hyaluronic acid has a water adsorption capacity of up to 1,000 times compared than its own mass, but uncrosslinked hyaluronic acid alone is decomposed within a few days in vivo, and the drug delivery effect is insignificant, so it was difficult to anticipate the role of the drug delivery system greatly.

In order to supplement the short half-life of this hyaluronic acid itself, a crosslinked hyaluronic acid gel was formed to the conventional hyaluronic acid using a relatively high ratio of crosslinking agent (BDDE), but this has a high probability of side effects when used in the body. When the ratio of the crosslinking agent is lowered to reduce the probability of side effects in the body, it becomes difficult to maintain the durability and physical properties of hyaluronic acid, but the main thigh to maintain the durability and physical properties is hyaluronic acid purification even if the ratio of the crosslinking agent is lowered.

Prior to purifying hyaluronic acid, the purification time was shortened through primary crushing conventionally, but there was a disadvantage in that the crosslinked hyaluronic acid gel swells during purification and thereby physical properties were reduced.

DISCLOSURE

Technical Problem

An embodiment of the present invention is to provide a drug delivery composition comprising two kinds of crosslinked hyaluronic acids having different swelling ratios, which has desired release characteristic behavior and a method for preparation thereof.

An additional example of the present invention is to provide a pharmaceutical composition comprising a drug delivery composition comprising two kinds of crosslinked hyaluronic acids having different swelling ratios and a drug.

Technical Solution

The present invention relates to a drug delivery composition using 2 or more crosslinked hyaluronic acids and a method for preparation thereof, and a pharmaceutical composition comprising the drug delivery composition and a drug to have desired release characteristic behavior.

The present invention develops a crosslinked hyaluronic acid as a drug delivery system to which crosslinking and purification technology is applied to increase physical properties while minimizing crushing of hyaluronic acid, and thereby, controls the in vivo decomposition period and release rate of a drug, and achieve sufficient drug efficacy even with single administration, and therefore, it can secure procedure convenience and lead to more effective and safe pain management for patients. In addition, it is possible to realize a technology capable of maintaining a constant drug release rate by stepwise controlling the decomposition rate of the hyaluronic acid gel by mixing gels with different swelling ratios of the crosslinked hyaluronic acid gel.

One embodiment of the present invention is a drug delivery composition comprising two kinds of crosslinked hyaluronic acids having different swelling ratios, in which the hyaluronic acid gels having different swelling ratios have a difference in the swelling ratio of 100% to 500%, and comprise the first crosslinked hyaluronic acid gel having a low swelling ratio and the second crosslinked hyaluronic acid gel having a high swelling ratio.

The drug delivery composition may have one or more physical properties selected from the group consisting of (1) a complex viscosity of 500,000 to 1,500,000 cp as measured at 0.02 Hz for a drug delivery composition sample with a solid content of 2% by weight, (2) a modulus of elasticity of 150 to 250 pa as measured at 1 Hz for a drug delivery composition sample with a solid content of 2% by weight, and (3) a swelling ratio of 100 to 250%.

The two kinds of crosslinked hyaluronic acids having different swelling ratios may have a difference in the swelling ratio of 100% to 500% and comprise the first crosslinked hyaluronic acid having a low swelling ratio and the second crosslinked hyaluronic acid having a high swelling ratio, and specifically, the first crosslinked hyaluronic acid may have a swelling ratio of 50 to 175%, and the second crosslinked hyaluronic acid may have a swelling ratio of 150 to 675%. In the present invention, the swelling ratio of the crosslinked hyaluronic acid may be represented by Equation 1 below, and more specifically, 2 g of crosslinked hyaluronic acid obtained by purification and crushing of the crosslinked reaction product is added to 25 mL phosphate buffer solution, and it is centrifuged at 2,000 rpm for 5 minutes and the supernatant is removed and then the weight of the swollen hyaluronic acid gel is measured and it is obtained by Equation 1 below. The weight of the crosslinked hyaluronic acid gel initially measured in Equation 1 below is the weight before the phosphate buffer solution is added, and for example, it is a product that has undergone purification and crushing of the crosslinked reaction product, and it may have a solid content of 0.5 to 5.0% by weight or 1.0 to 5.0% by weight and a water content of 95.0 to 99.0% by weight or 95.0 to 99.5% by weight.

Swelling ratio (%)=(weight of swollen crosslinked hyaluronic acid gel/initially measured weight of gel of crosslinked hyaluronic acid)×100    [Equation 1]

The modulus of elasticity (G') of the drug delivery composition according to the present invention may be measured in a frequency range of 0.02 Hz to 1 Hz using a rheometer, and the complex viscosity may be measured in a frequency range of 0.02 Hz to 1 Hz using a rheometer.

The first crosslinked hyaluronic acid having a low swelling ratio and the second crosslinked hyaluronic acid having a high swelling ratio may be prepared by a method comprising performing crosslinking reaction using a hyaluronic acid with a molecular weight of 1,000 kDa to 2,000 kDa and a crosslinking agent of 0.3 to 1.3 mol %, and purification and crushing processes. Specifically, in the step of performing crosslinking reaction, the two kinds of crosslinked hyaluronic acids having different swelling ratios may be prepared through purification and crushing processes by performing crosslinking reaction with different reaction volumns.

For example, the crosslinking reaction volume for preparing the first crosslinked hyaluronic acid may be of 100 to 800 mL, preferably, 150 to 800 mL, 150 to 700 mL, 150 to 600 mL, 150 to 550 mL, 200 to 800 mL, 200 to 700 mL, 200 to 600 mL, 200 to 550 mL, 250 to 800 mL, 250 to 700 mL, 250 to 600 mL, or 250 to 550 mL. The first crosslinked hyaluronic acid may have a low swelling ratio, and for example, the swelling ratio of 50 to 175%. The crosslinking reaction volume for preparing the second crosslinked hyaluronic acid may be 3 to 50 mL, preferably, 5 to 30 mL, and the second crosslinked hyaluronic acid may have a high swelling ratio, and for example, e the swelling ratio of 150 to 675%. Preferably, the difference between the first crosslinked hyaluronic acid having a low swelling ratio and the second crosslinked hyaluronic acid having a high swelling ratio may be 100% to 500%.

The drug delivery composition according to the present invention may comprise two kinds of crosslinked hyaluronic acids having different swelling ratios, and the hyaluronic acids having different swelling ratios may have a difference in the swelling ratio of 100% to 500%, and it may comprise the first crosslinked hyaluronic acid having a low swelling ratio and the second crosslinked hyaluronic acid having a high swelling ratio. In one specific embodiment, the mixing weight ratio of the first crosslinked hyaluronic acid having a low swelling ratio and the second crosslinked hyaluronic acid having a high swelling ratio comprised in the drug delivery composition (the first crosslinked hyaluronic acid: the second crosslinked hyaluronic acid) may be 5:1 to 1:5, 4:1 to 4:1, 3:1 to 1:3, 2:1 to 1:2, 1:1 to 5, 1:1 to 4, 1:1 to 3, 1:1 to 2, or 1:1.

The drug delivery composition according to the present invention may be used for preparation of a pharmaceutical composition comprising a drug to exhibit a specific drug release behavior. Therefore, another embodiment of the present invention provides a pharmaceutical composition comprising a drug delivery composition comprising two kinds of crosslinked hyaluronic acids having different swelling ratios according to the present invention and a drug.

The cumulative drug release amount of the pharmaceutical composition comprising the drug delivery composition according to the present invention and a drug, for example, a local anesthetic is 55 to 75% by weight for 24 hours, 70 to 90% by weight for 48 hours and 90% by weight or more for 72 hours, but the drug cumulative release amount for 48 hours has a drug release pattern with a difference of 5% by weight or more from the drug cumulative release amount for 24 hours. For example, preferably, the cumulative drug release amount for 24 hours may be 57 to 75% by weight, 59 to 75% by weight, or 60 to 75% by weight, and the cumulative drug release amount for 48 hours may be 75 to 90% by weight, 77 to 90% by weight, 80 to 90% by weight, 80% by weight or more to less than 90% by weight, 75 to 87% by weight, 77 to 87% by weight, or 80 to 87% by weight, but the drug cumulative release amount for 48 hours has a drug release pattern with a difference of 5% by weight or more from the drug cumulative release amount for 24 hours.

In the pharmaceutical composition comprising the drug delivery composition comprising two kinds or more of crosslinked hyaluronic acids having different welling ratios according to the present invention and a drug, based on the total solid content of the crosslinked hyaluronic acid and drug of 100% by weight, the solid content of the crosslinked hyaluronic acid may be 40 to 90% by weight and the content of the drug may be 10 to 60% by weight. Specifically, based on the total solid content of the crosslinked hyaluronic acid and drug in the pharmaceutical composition of 100% by weight, the solid content of the crosslinked hyaluronic acid may be 45 to 90% by weight, 50 to 90% by weight, 55 to 90% by weight, 60 to 90% by weight, 65 to 90% by weight, 70 to 90% by weight, 45 to 87% by weight, 50 to 87% by weight, 55 to 87% by weight, 60 to 87% by weight, 65 to 87% by weight, 70 to 87% by weight, 45 to 85% by weight, 50 to 85% by weight, 55 to 85% by weight, 60 to 85% by weight, 65 to 85% by weight, or 70 to 85% by weight, and the solid content of the drug may be 10 to 55% by weight, 10 to 50% by weight, 10 to 45% by weight, 10 to 40% by weight, 10 to 35% by weight, 10 to 30% by weight, 13 to 55% by weight, 13 to 50% by weight, 13 to 45% by weight, 13 to 40% by weight, 13 to 35% by weight, 13 to 30% by weight, 15 to 55% by weight, 15 to 50% by weight, 15 to 45% by weight, 15 to 40% by weight, 15 to 35% by weight, or 15 to 30% by weight.

If the drug achieves the desired release behavior, it can be used without particular limitation, and for example, it may be at least a local anesthetic selected from the group consisting of ropivacaine, bupivacaine, chlorprocaine, lidocaine, mepivacaine, procaine, tetracaine, levobupivacaine and articaine. When the pharmaceutical composition comprises a local anesthetic, the content of the local anesthetic may be 0.01 to 3% by weight, 0.05 to 3% by weight, 0.075 to 3% by weight, 0.1 to 3% by weight, 0.01 to 1% by weight, 0.05 to 1% by weight, 0.075 to 1% by weight, 0.1 to 1% by weight, 0.01 to 0.5% by weight, 0.05 to 0.5% by weight, 0.075 to 0.5% by weight, or 0.1 to 0.5% by weight, based on 1 mL comprising an additive (sodium chloride, sodium hydroxide, water for injection, hydrochloric acid).

In the present invention, hyaluronic acid is a biopolymer material in which repeating units consisting of N-acetyl-D-glucosamine and D-glucuronic acid are linearly connected, and in the present invention, hyaluronic acid is used as a meaning comprising all of hyaluronic acid itself, its salt or a combination thereof. The salt of hyaluronic acid includes for example, inorganic salts such as sodium hyaluronic acid, potassium hyaluronic acid, calcium hyaluronic acid, magnesium hyaluronic acid, zinc hyaluronic acid, cobalt hyaluronic acid, and the like and organic salts such as tetrabutylammonium hyaluronic acid, and the like, but not limited thereto. In the present invention, hyaluronic acid itself or a salt thereof alone, or hyaluronic acid itself or a salt thereof in combination of 2 or more kinds may be used. In the present invention, the molecular weight of hyaluronic acid may be in a range of molecular weight of 1,000 kDa to 2,000 kDa.

A crosslinked hyaluronic acid polymer or crosslinked hyaluronic acid derivative may be prepared by crosslinking the hyaluronic acid itself or its salt as above using a crosslinking agent. For crosslinking, a method for using a crosslinking agent under an alkaline aqueous solution may be used. As the alkaline aqueous solution, NaOH, KOH, or preferably, NaOH aqueous solution may be used, but not limited thereto. Then, the NaOH aqueous solution may be used at a concentration of 0.25N to 5N.

In addition, in the crosslinked hyaluronic acid derivative, a complex viscosity measured at 0.02 Hz for a sample of the drug delivery composition with the solid content of 2% by weight may be 500,000 to 1,500,000 cp.

The crosslinking agent is a compound comprising two or more of epoxy functional groups, and it may be various, and as a preferable example, it may include butandiol diglycidyl ether (1,4-butandiol diglycidyl ether: BDDE), ethylene glycol diglycidyl ether (EGDGE), hexanediol diglycidyl ether (1,6-hexanediol diglycidyl ether), propylene glycol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, tri-methylpropane polyglycidyl ether, bisepoxypropoxyethylene (1,2-(bis(2,3-epoxypropoxy)ethylene), pentaerythritol polyglycidyl ether and sorbitol polyglycidyl ether, and the like, and 1,4-butanedioldiglycidylether is particularly preferable.

In the method for crosslinking using the crosslinked hyaluronic acid according to the present invention and a crosslinking agent, a crosslinking agent of 0.3 to 1.3 mol %, preferably, 0.35 to 1.0 mol % may be used.

In the present invention, the term "degree of crosslinking" is defined as % weight ratio of the crosslinking agent to the hyaluronic acid monomer unit in the crosslinked portion of the hyaluronic acid-based composition. It is measured as the weight ratio of the crosslinking agent to the weight ratio of the hyaluronic acid monomer. In the present invention, in particular, the degree of crosslinking (MOD, Degree of Modification, mol %) of this hyaluronic acid may be 0.1 mol % to 5 mol %, 0.2 to 5 mol %, 0.25 to 5 mol %, 0.3 to 5 mol %, 0.35 to 5 mol %, 0.4 to 5 mol %, 0.1 mol % to 3 mol %, 0.2 to 3 mol %, 0.25 to 3 mol %, 0.3 to 3 mol %, 0.35 to 3 mol %, 0.4 to 3 mol %, 0.1 mol % to 2 mol %, 0.2 to 2 mol %, 0.25 to 2 mol %, 0.3 to 2 mol %, 0.35 to 2 mol %, 0.4 to 2 mol %, 0.1 mol % to 1 mol %, 0.2 to 1 mol %, 0.25 to 1 mol %, 0.3 to 1 mol %, 0.35 to 1 mol %, 0.4 to 1 mol %, specifically, 0.1 mol % to 5 mol %, 0.2 to 4 mol %, 0.3 to 3 mol %, 0.4 to 2 mol % or 0.4 to 1 mol % through crosslinking by the crosslinking agent as above.

The method for preparation of a drug delivery composition comprising at least two kinds of crosslinked hyaluronic acid gels having different swelling ratios according to one embodiment of the present invention may comprise (a) preparing a crosslinked reaction product by performing a crosslinking reaction with mixing a hyaluronic acid within a molecular weight of 1,000 kDa to 2,000 kDa or a salt thereof, and a crosslinking agent in an alkaline aqueous solution and at least two different reaction volumes, and (b) purifying and crushing the crosslinked reaction product to obtain at least two kinds crosslinked hyaluronic acids having different swelling ratios.

The crosslinked hyaluronic acid derivative prepared by the method according to the present invention may have a solid content of 0.5 to 5.0% by weight or 1.0 to 5.0% by weight and a water content of 95.0 to 99.0% by weight or 95.0 to 99.5% by weight.

In the (a) of preparing a crosslinking reaction product, specifically, a crosslinking reaction product may be prepared by adding hyaluronic acid or its salt at a concentration of 1 to 30% by weight based on a basic aqueous solution of 0.25 to 2.5N, for example, NaOH aqueous solution, adding a crosslinking agent of 0.3 to 1.3 mol %, preferably, 0.35 to 1.0 mol % for the hyaluronic acid to mix it with hyaluronic acid or its salt in a homogeneous state and performing crosslinking reaction with at least two kinds of different capacities. As one specific aspect, in the step, the crosslinking reaction of the hyaluronic acid and crosslinking agent may be achieved at 10 to 60° C., more preferably, 20 to 50° C., or most preferably, 25 to 40° C.

The crosslinking reaction of the step (a) of the method for preparation performs crosslinking reaction with different capacities. For example, the crosslinking reaction capacity for first crosslinked hyaluronic acid may be 100 to 800 mL, preferably, 150 to 800 mL, 150 to 700 mL, 150 to 600 mL, 150 to 550 mL, 200 to 800 mL, 200 to 700 mL, 200 to 600 mL, 200 to 550 mL, 250 to 800 mL, 250 to 700 mL, 250 to 600 mL, or 250 to 550 mL. The first crosslinked hyaluronic acid may have a low swelling ratio, and for example, it may have the swelling ratio of 50 to 175%. The second crosslinked hyaluronic acid may have a capacity of crosslinking reaction of 3 to 50 mL, preferably, 5 to 30 mL, and the second crosslinking hyaluronic acid may have a high swelling ratio, and for example, it may have the swelling ratio of 150 to 675%. Preferably, the difference in the swelling ratios of the first crosslinked hyaluronic acid having a low swelling ratio and the second crosslinked hyaluronic acid having a high swelling ratio may be 100% to 500%.

The step (b) of obtaining at least two kinds of more of crosslinked hyaluronic acids having different swelling ratios, obtains at least two kinds of crosslinked hyaluronic acids with different swelling ratios by performing purification and/or crushing. By performing the purification and crushing for each crosslinked reaction product obtained by crosslinking reaction with different capacities separately, at least two kinds of crosslinked hyaluronic acids having different swelling ratios may be obtained.

In the step (b), the first crosslinked hyaluronic acid having a low swelling ratio may have a capacity of crosslinking reaction of 100 to 800 mL, and a pre-crushed product is obtained by pre-crushing the obtained crosslinking reaction product having a relatively large reaction volume using a sieve having a pore diameter of 500 to 2,000 μm, for example, a pore diameter of 1000 μm. By purifying the pre-crushed product, a non-reacted crosslinking agent may be removed and pH may be stabilized at a level of 6.5 to 7.5. In order to remove the crosslinking agent, and the like, the crosslinked hyaluronic acid may be washed by using a washing water, and saline solution or phosphate buffer solution or the like may be used as the washing water, but not particularly limited.

The purified crushed product may be performed by passing through a sieve having a pore diameter of 20 μm to 500 μm, 50 μm to 500 μm, 100 μm to 500 μm, 150 μm to 500 μm, 200 μm to 500 μm, 20 μm to 450 μm, 50 μm to 450 μm, 100 μm to 450 μm, 150 μm to 450 μm, or 200 μm to 450 μm, for example, a pore diameter of 350 μm.

In the step (b), the second crosslinked hyaluronic acid having a high swelling ratio obtained a crosslinked reaction product in which crosslinking reaction is performed with a reaction volume of 3 to 50 mL, and a non-reacted crosslinking agent is removed by performing a purification process without a crushing process, and the pH is stabilized at a level of 6.5 to 7.5. In the step (b), to remove a crosslinking agent, and the like, the crosslinked hyaluronic acid may be washed by using washing water, and as the washing water, saline solution or phosphate buffer solution, or the like may be used, but not particularly limited. For the second crosslinked hyaluronic acid having a high swelling ratio, a crushing process is performed for the crosslinked reaction product, after completing purification, and the crushing may be performed by passing through a sieve having a pore diameter of 20 μm to 500 μm, 50 μm to 500 μm, 100 μm to 500 μm, 150 μm to 500 μm, 200 μm to 500 μm, 20 μm to 450 μm, 50 μm to 450 μm, 100 μm to 450 μm, 150 μm to 450 μm, or 200 μm to 450 μm, for example, a pore diameter of 350 μm.

The solid content of the first crosslinked hyaluronic acid obtained after performing the pre-crushing, purification and crushing processes may be 2.0% by weight or less, or 1.5% by weight or less, for example, 0.5 to 2.0% by weight, 0.5 to 1.5% by weight, 1.0 to 1.5% by weight, or 1.1 to 1.4% by weight, and the remainder may be the water content. The solid content of the second crosslinked hyaluronic acid obtained after performing the purification and crushing processes may be 1.5% by weight or more, 2.0% by weight or more, or 2.5% by weight or more, for example, 1.5 to 5.0% by weight, 2.0 to 5.0% by weight, 2.5 to 5.0% by weight, or 3.0 to 5.0% by weight, and the remainder other than the solid content among the total 100% by weight may be the water content.

The hyaluronic acid having different swelling ratios has a difference in the swelling ratio of 100% to 500%, and it may comprise the first crosslinked hyaluronic acid having a low swelling ratio and the second crosslinked hyaluronic acid having a high swelling ratio, or the first crosslinked hyaluronic acid may have a swelling ratio of 50 to 175%, and the second crosslinked hyaluronic acid may have a swelling ratio of 150 to 675%.

In the step (b) of the method for preparation may comprise obtaining at least two kinds of crosslinked hyaluronic acids having different swelling ratios by performing purification and crushing for the crosslinked reaction product obtained by crosslinking reaction with different capacities separately, and further mixing the at least two kinds of crosslinked hyaluronic acids having different swelling ratios. The first crosslinked hyaluronic acid may be prepared by performing primary crushing with a sieve, purifying, and secondary crushing with a sieve for the crosslinked reaction product. In addition, the second crosslinked hyaluronic acid may be prepared by preforming purifying and crushing with a sieve for the crosslinked reaction product.

The drug delivery composition prepared by the method may be prepared by adjusting a solid content of the product, and further comprising a process of container filling, sterilizing and packaging.

Advantageous Effects

The present invention develops a crosslinked hyaluronic acid as a drug delivery system to which crosslinking and purification technology is applied to increase physical properties while minimizing crushing of hyaluronic acid, and thereby, controls the in vivo decomposition period and release rate of a drug, and achieve sufficient drug efficacy even with single administration, and therefore, it can secure procedure convenience and lead to more effective and safe pain management for patients.

BRIEF DESCRIPTION OF THE DRAWINGS

FIG. 1 is a result of confirming the degree of welling for the crosslinked hyaluronic acid prepared according to one embodiment of the present invention.

FIG. 2 is a result of confirming the modulus of elasticity (G) for the crosslinked hyaluronic acid prepared in Example 1.

FIG. 3 is a result of confirming the complex viscosity (cp) for the crosslinked hyaluronic acid prepared in Example 1.

FIG. 4 is a result of confirming the degree of welling for the crosslinked hyaluronic acid prepared in Example 2.

FIG. 5 is a result of confirming the modulus of elasticity (G) for the crosslinked hyaluronic acid prepared in Example 2.

FIG. 6 is a result of confirming the complex viscosity (cp) for the crosslinked hyaluronic acid prepared in Example 2.

FIG. 7 is a graph showing drug release behavior of bupivacaine for the crosslinked hyaluronic acid prepared in Example 1.

FIG. 8 is a graph showing drug release behavior of ropivacaine for the crosslinked hyaluronic acid prepared in Example 2.

FIG. 9 is a graph showing the result of measuring the mechanical allodynia degree (threshold) after administering a drug preparation comprising the crosslinked hyaluronic acid prepared in Example 2 (Voferon-L60) and ropivacaine into experimental animals.

FIG. 10 is a result of observing the muscle and sciatic nerve around the administration site after administering a drug preparation comprising the crosslinked hyaluronic acid prepared in Example 2 (Voferon-L60) and ropivacaine into experimental animals.

FIG. 11 is a graph showing the result of measuring the concentration of ropivacaine in blood of the test groups, Ge, Gf and Gg over time, after administering a drug preparation comprising the crosslinked hyaluronic acid prepared in Example 2 (Voferon-L60) and ropivacaine, and SC means 0.9% sodium chloride, and Vo means Voferon-L60, and Ro means ropivacaine.

FIG. 12 is a graph showing the result of measuring the AUC (area under the concentration in blood—time curve) average of the test groups, Ge, Gf and Gg over time, after administering a drug preparation comprising the crosslinked hyaluronic acid prepared in Example 2 (Voferon-L60) and ropivacaine, and $AUC_{0-48\ hr}$ means an area average for 48 hours.

MODE FOR INVENTION

The present invention will be described in more detail by the following examples, but the scope of the present invention is not intended to be limited by the following examples.

Example 1: Preparation and Physical Property Evaluation of Crosslinked Hyaluronic Acid 1-1: Preparation of Crosslinked Hyaluronic Acid Non-crosslinked hyaluronic acid having a molecular weight of 1,500,000 Da (repeated unit molecular weight 401.3) of 100 parts by weight was dissolved in 0.25N NaOH solution of 400 parts by weight to prepare a hyaluronic acid solution of 20% by weight. A crosslinking agent, 1,4-butanediol diglycidyl ether (BDDE) was added at a ratio of 0.7 mol % to the hyaluronic acid solution, and it was reacted with each of 4 different capacities, and specifically, by aliquoting JPD001 with a capacity volume of 400 mL, JPD002 with 5 mL, JPD003 with 15 mL and JPD004 with 25 mL to perform crosslinking reaction at a room temperature for 24 hours, and thereby, crosslinked reaction products having different reaction volumes were obtained.

The JPD001 after completing crosslinking reaction obtained a primary crushed product so that the diameter of each crushed product was about 1,000 μm by crushing it by passing through a sieve with a pore diameter of 1,000 μm. Then, the primary crushed product of the JPD001 was washed with phosphate buffer solution several times and non-reacted BDDE was removed, and the pH was stabilized at a level of 6.5 to 7.5, and the time taken for purification was 24 hours.

Moreover, the JPD002, JPD003 and JPD004 reaction products in which crosslinking reaction was completed were washed with phosphate buffer solution without a crushing process themselves several times to remove non-reacted BDDE and the pH was stabilized at a level of 6.5 to 7.5. The time taken for the purification process was about 36 hours for the JPD002 and JPD003 reaction products and it was about 72 hours for the JPD004 reaction product.

The obtained 4 kinds of reaction products (JPD001, JPD002, JPD003, JPD004) were crushed by passing through a sieve of a pore size 300 μm, and the content of the solid was measured by the drying and reducing test method of the Korean Pharmacopoeia. The solid content of the reaction product obtained after crushing was 1.4 wt/wt % for JPD001, 2.2 wt/wt % for JPD002, 2.5 wt/wt % for JPD003, and 3.9 wt/wt % for JPD004.

In order to prepare a sample product with a solid content of 2.0% by weight, the JPD001 reaction product was adjusted to 2.0% by weight by adding non-crosslinked hyaluronic acid used as a raw material for the crosslinking reaction, and since the JPD002, JPD003, JPD004 reaction products had a solid content exceeding 2.0% by weight, PBS was added and diluted to 2.0% by weight so that the solid content was to be 2.0% by weight. The obtained 4 kinds of samples were sterilized at 121° C. for 20 minutes to prepare a crosslinked hyaluronic acid gel.

A sample comprising the purified and crushed JPD002 to JPD004 reaction products has little water absorption in the purification process of the crosslinked reaction product, so when mixed with an aqueous solution comprising a drug, the crosslinked hyaluronic acid swells and the drug may be more incorporated into the crosslinked hyaluronic acid. On the other hand, the JPD001 with the crosslinking reaction volume of 400 mL is in a state of absorbing much more moistures because of having the solid content lower than the solid content comprised in a commercial product of 2%, and thus, when it is mixed with a drug, the drug amount that can be mixed is rather low.

1-2: Physical Property Evaluation of Crosslinked Hyaluronic Acid

For the prepared crosslinked hyaluronic acid gels, JPD001, JPD002, JPD003, JPD004 and (mixture including JPD001 and JPD004 at a weight ratio of 1:1), the ratio of the swelling ratio, the modulus of elasticity and the complex viscosity were measured, to show the result in Table 1 and FIG. 1 to FIG. 3.

(1) Swelling Ratio

Each sample 2 g was accurately weighted and added to a 50 mL conical tube, and 25 mL phosphate buffer solution was added, and then it was shaken at 100 rpm for 15 minutes and centrifuged at 2,000 rpm for 5 minutes and the supernatant of the conical tube was removed, and then the weight of the swollen hyaluronic acid gel was measured, and it means a swelling ratio as Equation 1 below. In the Equation 1 below, the initially measured weight of the crosslinked hyaluronic acid gel is a weight before phosphate buffer solution is added, and substantially, it is a weight of a sample comprising the solid content obtained in Example 1 of 2.0% by weight.

Swelling ratio (%)=(weight of swollen gel of crosslinked hyaluronic acid gel/initial weight of gel of crosslinked hyaluronic acid)×100    [Equation 1]

(2) Modulus of Elasticity

In order to compare rheological properties, a modulus of elasticity (G') was measured within a frequency range of 0.02 Hz to 1 Hz by using a rheometer.

(3) Complex Viscosity

In order to compare rheological properties, a complex viscosity was measured within a frequency range of 0.02 Hz to 1 Hz by using a rheometer.

[Analysis Condition of Rotational Rheometer]

(a) Test equipment: Rotational Rheometer (KINEXUS pro+)
(b) Frequency: 0.01 to 1 Hz
(c) Temperature: 25
(d) Strain: 4%
(e) Measuring geometry: 40 mm plate
(f) Measuring gap: 0.145 mm

TABLE 1

| Name | Swelling ratio (%) | Storage modulus of elasticity | Complex viscosity (cP) |
| --- | --- | --- | --- |
| Sample 1-1 (JPD001) | 143.29 | 318 | 3,226,514 |
| Sample 1-2 (JPD002) | 260.74 | 189 | 2,413,216 |
| Sample 1-3 (JPD003) | 333.90 | 157 | 1,573,636 |
| Sample 1-4 (JPD004) | 591.25 | 98 | 804,534 |
| Sample 1-5 (JPD001 + JPD004) | 221.45 | 219 | 1,078,940 |

The lower the swelling ratio, the faster the drug release proceeds when mixed with the local anesthetic solution and applied to the body, and conversely, the higher the swelling ratio, the slower the drug release rate. Specifically, as shown in FIG. 7, the drug was released the fastest in case of JPD001 having the lowest swelling ratio, and the drug release rate was shown as the lowest in case of JPD004 having the highest swelling ratio. The lower the modulus of elasticity of the crosslinked hyaluronic acid, the higher the degree of spread within the tissue when applied to the body, and in other words, an effect of reducing pain of the local anesthetic may be provided in a wide area. The lower the complex viscosity, the easier it is to use because the injection force is lower when an injection needle is used when applied to the body. Regarding the drug release rate, the swelling ratio acts as the most important factor, and in case of the modulus of elasticity and complex viscosity, it acts as a factor supporting the action of the local anesthetic in actual clinical application. The swelling ratio of the crosslinked hyaluronic acid shown in Table 1 above was shown within a range of 100 to 600, and it could be confirmed that the drug was stably released under the condition of mixing JPD001 and JPD004 for 3 days when the pain was the most severe.

Example 2: Preparation and Physical Property Evaluation of Crosslinked Hyaluronic Acid 2-1: Preparation of Crosslinked Hyaluronic Acid Non-crosslinked hyaluronic acid having a molecular weight of 1,500 kDa (repeated unit molecular weight 401.3) of 100 parts by weight was dissolved in 0.25N NaOH solution of 400 parts by weight to prepare a hyaluronic acid solution of 20% by weight. A crosslinking agent, 1,4-butanediol diglycidyl ether (BDDE) was added at a ratio of 0.4 mol % to the hyaluronic acid solution, and it was reacted with each of 3 different capacities, and specifically, by aliquoting JD005 with a capacity volume of 400 mL, JD006 with 5 mL, and JD007 with 25 mL to perform crosslinking reaction at a room temperature for 24 hours, and thereby, crosslinked reaction products having different capacities were obtained.

Non-crosslinked hyaluronic acid having a molecular weight of 1,500 kDa was dissolved in 0.25N NaOH solution to prepare a hyaluronic acid solution of 20% by weight. A crosslinking agent, 1,4-butanediol diglycidyl ether (BDDE) was added at a ratio of 0.4 mol % to the hyaluronic acid solution, and it was reacted with each of 4 different capacities, and specifically, by aliquoting JD005 with a capacity volume of 400 mL, JD006 with 5 mL, and JD007 with 25 mL to perform crosslinking reaction at a room temperature for 24 hours, and thereby, crosslinked reaction products having different capacities were obtained.

The JD005 after completing crosslinking reaction obtained a primary crushed product so that the diameter of each crushed product was about 1,000 μm by crushing it by passing through a sieve with a pore diameter of 1,000 μm. Then, the primary crushed product of the JD005 was washed with phosphate buffer solution several times and non-reacted BDDE was removed, and the pH was stabilized at a level of 6.5 to 7.5, and the time taken for purification was 24 hours.

Moreover, the JD006 and JD007 reaction products in which crosslinking reaction was completed were washed with phosphate buffer solution without a crushing process themselves several times to remove non-reacted BDDE and the pH was stabilized at a level of 6.5 to 7.5. The time taken for the purification process was about 36 hours for the JD006 reaction product and it was about 72 hours for the JD006 reaction product.

The obtained 3 kinds of reaction products (JD005, JD006, JD007) were crushed by passing through a sieve of a pore size 300 μm, and the content of the solid was measured by the drying and reducing test method of the Korean Pharmacopoeia. The solid content of the reaction product obtained after crushing was 1.1 wt/wt % for JD005, 1.8 wt/wt % for JD006, and 2.5 wt/wt % for JD007.

In order to prepare a sample product with a solid content of 2.0% by weight, the JD005 and JD006 reaction products were adjusted to 2.0% by weight by adding non-crosslinked hyaluronic acid used as a raw material for the crosslinking reaction, and since the JD007 reaction product had a solid content exceeding 2.0% by weight, PBS was added and diluted to 2.0% by weight so that the solid content was to be 2.0% by weight. The obtained 3 kinds of samples were sterilized at 121° C. for 20 minutes to prepare a crosslinked hyaluronic acid gel.

2-2: Physical Property Evaluation of Crosslinked Hyaluronic Acid

For the prepared crosslinked hyaluronic acid gels, JD005, JD006, JD007, and (mixture comprising JD005 and JD007 at a weight ratio of 1:1), the ratio of the swelling ratio, modulus of elasticity and complex viscosity were measured, and the result was shown in Table 2 and FIG. 4 to FIG. 6.

TABLE 2

| Name | Swelling ratio (%) | Modulus of elasticity (G') | Complex viscosity (cP) |
|---|---|---|---|
| Sample 2-1 (JD005) | 63.2 | 88.2 | 287,800 |
| Sample 2-2 (JD006) | 138.9 | 90.6 | 328,150 |
| Sample 2-3 (JD007) | 221.0 | 90.0 | 299,600 |
| Sample 2-4 (JD005& JD007) | 121.9 | 185.4 | 737,650 |

As shown in Table 2 and FIG. 4 to FIG. 6 above, when comparing physical properties of the sample in which JD005+JD007 having different swelling ratios by 1:1 with those of Sample-JD006 having a similar swelling ratio, the mixed sample shows a modulus of elasticity (G') by about 2 times. A sample having a low elasticity value has high spreadability in the tissue when injected into the tissue and is highly likely to be scattered within the tissue. Therefore, it was confirmed that the preferable swelling ratio range was 100 to 200%.

In case of the complex viscosity analysis data, when comparing physical properties of the (JD005+JD007) sample having different swelling ratios with those of sample-JD006 having a similar swelling ratio, the mixed sample showed the result of the complex viscosity higher by about 2 times. Therefore, it was confirmed that the preferable range of the value of the modulus of elasticity (G') measured at 1 Hz was 0 to 250 pa(1 Hz) and the value of the complex viscosity measured at 0.02 Hz was 500,000 to 1,500,000 cp (0.02 Hz).

Example 3: Release Behavior Evaluation of Drug Using Crosslinked Hyaluronic Acid (Bupivacaine)

By mixing the crosslinked hyaluronic acid gels, JPD001, JPD004 and (mixture of JPD001 and JPD004 at a weight ratio of 1:1) comprising the crosslinked hyaluronic acid solid prepared in Example 1 at a content of 2% by weight, which are Samples 1-1, 1-4 and 1-5 of Example 1 of 6 g, respectively, and 0.75% by weight bupivacaine solution 3 g, a drug preparation was prepared. A preparation in which non-crosslinked hyaluronic acid having a molecular weight of 1,500 kDa (repeated unit molecular weight 401.3) 2% by weight and a preparation comprising only the bupivacaine drug were prepared, respectively, as a control group.

The prepared drug preparation was put in a dialysis bag (MWCO: 12 K-14 K Da), separately. Then, the dialysis bag was immersed into a tube with 15 ml phosphate buffer solution. The 50 mL conical tube in which the immersed dialysis bag was put was placed in a shaking tank maintained at 37° C. and shaken at 100 rpm horizontally. Then, at scheduled time intervals, a release medium (PBS) aliquot of 1.5 mL was collected and the entire release medium was replaced with new PBS to maintain a sink condition. Quantification of the released bupivacaine was determined by reverse-phase high-performance liquid chromatography (RP-HPLC) using a ZORBAX Eclipse XDB C18 column (4.6 mm×250 mm, 5 μm) and acetonitrile/pH 8.0 buffer (60:40, v/v) for 10 minutes or more. The drug release behavior was evaluated and the result was shown in FIG. 7.

As shown in the temporal drug release behavior of FIG. 7, in the cumulative release amount for each time period of bupivacaine, 99% was released within 8 hours when bupivacaine was used alone. In case of crosslinked hyaluronic acid 2% solution, 65.8% of bupivacaine was released after 8 hours, and 99% was released after 24 hours. In case of JPD001 with a relatively low swelling ratio (Sample 1-1), 70% release was achieved for 24 hours, and 96.7% bupivacaine was released for 48 hours. JPD004 with a high swelling ratio (Sample 1-4) showed a relatively low release rate initially, and 85.3% was released for 72 hours. In addition, the drug delivery system in which JPD001 and JPD004 were mixed at a weight ratio of 1:1 (Sample 1-5) showed the release rate as same as JPD001 at the beginning of release, and then showed a profile of slowly releasing, and specifically, the cumulative amount of the drug release showed a release pattern of 60% for 24 hours, 75% for 48 hours and 90% or more for 72 hours.

Therefore, it was confirmed that the local anesthetic was gradually released when applied to the body, and it was possible to reduce the pain during the most painful three(3) days after surgery.

Example 4: Release Behavior Evaluation of Drug (Ropivacaine)

By mixing the crosslinked hyaluronic acid gels, JD006, JD007 and (mixture of JD005 and JD007 at a weight ratio of 1:1) comprising the crosslinked hyaluronic acid solid prepared in Example 2 at a content of 2% by weight, which are Sample 2-2, Sample 2-3 and Sample 2-4 according to Example 2 of 6 g, respectively, and 0.75% by weight ropivacaine solution 3 g, a drug preparation was prepared. A preparation in which non-crosslinked hyaluronic acid having a molecular weight of 1,500 kDa (molecular weight 401.3 of repeat unit) 2% by weight and a preparation comprising only the bupivacaine drug were prepared, respectively, as a control group.

For the prepared drug preparations, the drug release behavior was evaluated by the method as Example 3, and the result was shown in FIG. 8.

As shown in the temporal drug release behavior of FIG. 8, in case of a filler of HA, 99% was released within 24 hours, and in case of the JD006 (Sample 203) and JD005+ JD007 mixture (Sample 2-4), a profile in which the swelling ratio was similar, but in case of the mixture, it was released by 72 hours was shown. Specifically, the cumulative amount of JD006 (Sample 2-3) release showed a release pattern of 90% for 24 hours and 95% or more for 48 hours. In addition, when using the JD005+JD007 mixture (Sample 2-4), the cumulative amount of the drug release showed a release pattern of 60.7% for 24 hours, 79.6% for 48 hours and 90.8% for 72 hours. Therefore, it was confirmed that the local anesthetic was gradually released when applied to the body, and it was possible to reduce the pain during the most painful three(3) days after surgery.

Example 5. Pain Relief Effect and Safety Evaluation According to Mixed Administration of Surgical Product (Voferon-L60) Injection Solution and Ropivacaine 5.1: Test Animal Preparation
1) Test System Specific pathogen-free (SPF) Sprague-Dawley rats [Crl: CD (Sprague Dawley)] (Producer: Orient Bio Inc. (322, Galmachi-ro, Jungwon-gu, Seongnam-si, Gyeonggi-do)) were prepared according to the following condition.
 (1) Number of animals at acquisition: male 28 rats
 (2) Age at acquisition: about 7-week-old
 (3) Body weight range at acquisition: 199.29 to 222.35 g
 (4) Age at start of administration: about 8-week-old
 (5) Body weight range at start of administration: 265.63 to 294.00 g
 (6) Number of animals used: 24 rats
 (7) Group separation The body weight was measured on the day before administration, and group separation was performed by weight ranked using Excel program. Only animals belonging to the range of ±20% of the mean body weight were used for the test.

2) Breeding environment
 (1) Temperature and humidity range: temperature 22±3° C., relative humidity 50±20% RH
 (2) Ventilation times: 10~15 times/hr
 (3) Light and shade cycle: fluorescent lighting 12 hr (08:00 light-on ~20:00 light-off)
 (4) Illumination: 150~300 lx
 (5) Noise: 60 dB or less
 (6) Ammonia concentration: 5 ppm or less
 (7) Breeding box and breeding density During the quarantine, acclimatization, administration and observation periods, 3 or less animals were housed in a stainless steel net breeding box (250 W×350 L×180 H mm), and 1 or less animal was housed during the administration and observation periods. Replacement of the breeding box was conducted during group separation.

(8) Feed and water

Feed (Teklad Certified Irradiated Global 18% Protein Rodent Diet, Envigo, USA) was supplied from Koatech (181-21, Jinwi-ro, Sinwi-myeon, Pyeongtaek-si, Gyeonggi-do) and placed in a feeder and ingested freely. After purifying drinking tap water, water was put into a polycarbonate water bottle and ingested freely.

5.2: Test Group Preparation

After disinfecting the left plantar part of the prepared test animals under general anesthesia, the skin and fascia with a length of 1 cm were incised in the longitudinal direction starting from the part 0.5 cm away from the tip of the back of the foot. The sole muscle (plantar muscle) of the incised part was lifted with forceps to separate 1 cm in length. Both ends of the longitudinal direction were lifted and separated carefully so that the plantar muscle did not fall off, and to the sciatic nerve part of the lateral biceps femoris on the left thigh, a preparation comprising Sample 2-4 which was the mixture of JD005 and JD007 at a weight ratio of 1:1, which were crosslinked hyaluronic acid gels comprising the crosslinked hyaluronic acid solid prepared in Example 2 of 2% by weight (Voferon-L60) and ropivacaine was administered once and the skin was sutured and the test groups were composed as Table 3 below. All Ga to Gd doses ($\mu\ell$) of 600 $\mu\ell$ were equally administered near the nerve tissue, and the number of animals comprised in the experimental group were 6.

TABLE 3

| Animal group | | Ga | Gb | Gc | Gd |
|---|---|---|---|---|---|
| Animal number | | Ga-1~ Ga-6 | Gb-7~ Gb-12 | Gc-13~ Gc-18 | Gd-19~ Gd-24 |
| Ropivacaine concentration (% w/w) | | 0 | 0.75 | 0.75 | 0.75 |
| Preparation ratio ($\mu\ell$) | 0.9% sodium chloride (SC) | 600 | 300 | 0 | 0 |
| | Voferon-L60 (Vo) | 0 | 0 | 300 | 400 |
| | Ropivacaine (Ro) | 0 | 300 | 300 | 200 |
| Solid content of Voferon-L60 (Vo) (mg) | | 0 | 0 | 6 | 8 |
| Solid content of ropivacaine (mg) | | 0 | 2.25 | 2.25 | 1.5 |

The drug preparation to be administered to Gc used the crosslinked hyaluronic acid gel 3 g at a concentration of 2% by weight, and ropivacaine solution 3 g at a concentration of 0.75% by weight, and when these were converted into the solid content of each of active ingredients, the crosslinked hyaluronic acid 60 mg and ropivacaine 23 mg were comprised, and based on the total solid content of the crosslinked hyaluronic acid and drug of 100% by weight, the solid content of voferon-L60 was 72.2% by weight and the solid content of ropivacaine was 27.3% by weight.

The drug preparation to be administered to Gd used the crosslinked hyaluronic gel 4 g at a concentration of 2% by weight and ropivacaine solution 2 g at a concentration of 0.75% by weight, and when these were converted into the solid content of each of the active ingredients, the crosslinked hyaluronic acid 80 mg and ropivacaine 15 mg were comprised, and based on the total solid content of the crosslinked hyaluronic acid and drug of 100% by weight, the solid content of voferon-L60 was 84.2% by weight and the solid content of ropivacaine was 15.8% by weight.

5.3: Test Method

As a method for measuring the degree of mechanical allodynia after preparing the test groups, a white rat was placed in a wire mesh cage with a net eye size of 2×2 mm and acclimatized for 15 minutes or more, and then the continuous reaction was evaluated by an up-down method using 8 consecutive von Frey filaments (1, 2, 4, 6, 8, 15, 26, 60 g, Stoelting, USA) when the movement of the rat became quiet. The filaments were placed in vertical contact with the sole of the left affected area and held for 5-6 seconds and it was considered as positive reaction was shown, when the rat exhibited a quick avoidance response or immediately flinched while removing hairs or licked the sole. It was progressed as the weak filament was stimulated when the positive reaction was shown by stimulating from the von Frey filament in the center, and the strong filament was stimulated when there was no positive reaction. By the above method, measurement was performed before, and at 1, 2, 4, 8, 24, 48, 72, 120, 168 hours after administration of the test substance. For interpretation of the result of the pain behavior test, the case in that avoidance reaction was shown or the foot was lifted up on the net while in contact with a plastic plate was determined as positive. Stimulation was given twice at an interval of 3-5 minutes, and using the positive threshold among them, a response change curve with time was obtained.

In addition, to investigate the local toxicity of the drug administration site appearing when the mixture of the injection solution used in the test substance surgical product (Voferon-L60) for stability evaluation and ropivacaine was administered around the sciatic nerve of the test group, in 14 days after administration of the test substance, the muscle and sciatic nerve around the administration site were cut and subjected to general tissue processing process such as tramming, dehydration and paraffin embedding to produce and slice tissue sections, and H&E staining (Hematoxylin & Eosin stain) was conducted and then microscopic examination was carried out.

5.4: Pharmacodynamic Analysis Result

The pharmacodynamic analysis result according to the time-dependent response after drug administration was shown in Table 4 and FIG. 9 below. Pain threshold values were measured before and at 1, 2, 4, 8, 24, 48, 72, 120, 168 after administration of the test substance of each animal of the Ga to Gd group test groups, and the average of the threshold values of each test group was calculated. In Table 4 below, the threshold value (g) measured over time of drug administration was shown.

TABLE 4

| Hour (hr) | Ga group | Gb group | Gc group | Gd group |
|---|---|---|---|---|
| 0 | 60 | 60 | 60 | 60 |
| 1 | 9.8 | 60 | 60 | 60 |
| 2 | 9.5 | 60 | 60 | 60 |
| 4 | 10.5 | 37.3 | 48.7 | 60 |
| 8 | 10.5 | 31.7 | 45.8 | 57.2 |
| 24 | 10 | 28.0 | 30.8 | 39.3 |
| 48 | 10.8 | 17.5 | 20.5 | 24.2 |
| 72 | 22 | 29.8 | 35.5 | 43 |
| 120 | 54.3 | 60 | 60 | 60 |
| 168 | 60 | 60 | 60 | 60 |

In the Ga group, the average threshold (g) value measured from 1 hour after surgery started to decrease to 9.8 g and the average threshold was 10.8 g after 48 hours, and the pain was gradually recovered stably and completely recovered at 168 hours.

In the Gb group, the average threshold started to decrease to 37.3 g from 4 hour after surgery and the average threshold was 17.5 g after 48 hours, and the pain was gradually recovered stably and completely recovered at 120 hours.

In the Gc group, the average threshold started to decrease to 48.7 g from 4 hour after surgery and the average threshold was 20.5 g after 48 hours, and the pain was gradually recovered stably and completely recovered at 120 hours.

In the Gd group, the average threshold started to decrease to 57.2 g from 8 hour after surgery and the average threshold was 24.2 g after 48 hours, and the pain was gradually recovered stably and completely recovered at 120 hours.

As the result of comparing the pharmacodynamic change of the physiological saline solution mixed administration group (Ga and Gb) and Voferon-L60 mixed administration group (Gc and Gd) in the analysis result of the test groups, it was confirmed that the effect of pain relief was greater as the threshold was highly measured in the Voferon-L60 mixed administration group. Such result was determined as an effect occurring as the drug release was delayed by mixed administration with Voferon-L60.

Furthermore, when comparing Gc and Gd, it was confirmed that an effect of pain relief was greater as the threshold was highly measured in the Gd in which the ropivacaine concentration was lower and the concentration of Voferon-L60 was higher. Such result was determined as an effect occurring as the drug release of ropivacaine according to the increase of the concentration of Voferon-L60 was delayed. Therefore, it was determined that as the concentration of Voferon-L60 increased, the drug release was controlled and the effect of pain relief increased.

5.5: Histopathological Observation Result

After performing H&E staining of the muscle and sciatic nerve around the administration site, the result of microscopic examination was shown in FIG. 10.

As shown in the representative photograph of the Ga, Gb, Gc and Gd groups in FIG. 10a, a foreign body was locally observed bordered around the nerve of Gc-14 and Gc-15, and infiltration of inflammatory cells along with the foreign body was observed in Gd-21. In this regard, the observed infiltration of inflammatory cells was presumed to be due to the residual of some test substances administered, and was not related to toxicity by the test substances. Except for the above observation, no abnormalities were observed in the muscle and sciatic nerve around the test substance administration site in all the test groups. Based on these results, as the result of administering the mixture of the injection solution used for the surgery product (Voferon-L60) and ropivacaine around the sciatic nerve, it was determined that there was no local toxicity by the test substances, and it was determined that an effect of pain relief was increased as the drug release of ropivacaine was controlled according to the increase of the Voferon-L60 concentration.

Example 6. Pharmacokinetic Evaluation According to Mixed Administration of Injection Solution of Surgical Product (Voferon-L60) and Ropivacaine

6.1: Test Animal Preparation

Specific pathogen-free (SPF) Sprague-Dawley rats [Crl: CD (Sprague Dawley)] (Producer: Orient Bio Inc. (322, Galmachi-ro, Jungwon-gu, Seongnam-si, Gyeonggi-do)) were prepared according to the following condition.

(1) Number of animals at acquisition: male 18 rats
(2) Age at acquisition: about 8-week-old
(3) Body weight range at acquisition: 256.91 to 272.24 g
(4) Age at start of administration: about 9-week-old (5) Body weight range at start of administration: 259.33 to 272.24 g
(6) Number of animals used: 15 rats
(7) Group separation The body weight was measured on the day before administration, and group separation was performed by weight ranked using Excel program. Only animals belonging to the range of ±20% of the mean body weight were used for the test.

During the quarantine, acclimatization, administration and observation periods, 3 or less animals were housed in a stainless steel net breeding box (250 W×350 L×180 H mm), and 2 or less animal was housed during the administration and observation periods, and other conditions were practically the same as the test group breeding environment of Example 5.

6.2: Test Group Preparation

After performing inhalation anesthesia on the prepared test animals using isoflurane and incision of the skin of the thigh area, around the sciatic nerve part, a preparation comprising Sample 2-4 which was the mixture of JD005 and JD007 at a weight ratio of 1:1, which were crosslinked hyaluronic acid gels comprising the crosslinked hyaluronic acid solid prepared in Example 2 (Voferon-L60) and ropivacaine was administered once and the skin was sutured and the test groups were composed as Table 5 below. All Ge to Gg doses ($\mu\ell$) were set to 600 $\mu\ell$ equally, and the number animals comprised in the experimental group were 5.

TABLE 5

| Experiment group | Ge | Gf | Gg |
|---|---|---|---|
| Animal number | Ge-1~Ge-5 | Gf-6~Gf-10 | Gf-11~Gf-15 |
| Ropivacaine concentration (wt/wt %) | 0.75 | 0.75 | 0.75 |
| Preparation ratio ($\mu\ell$) 0.9% sodium chloride (SC) | 300 | 0 | 0 |
| Voferon-L60 (Vo) | 0 | 300 | 400 |
| Ropivacaine (Ro) | 300 | 300 | 200 |
| Solid content of Voferon-L60 (Vo) (mg) | 0 | 6 | 8 |
| Solid content of ropivacaine (mg) | 2.25 | 2.25 | 1.5 |

6.3: Test Animal Blood-Gathering

Using a disposable syringe from the jugular vein, about 0.5 $\mu\ell$ of blood from the test groups was collected before and at 0.5, 1, 2, 4, 6, 8, 12, 24 and 48 hours after administration of the test substances. The collected blood was transferred to a heparin-treated tube (5 IU/ml) and centrifuged at 12,000 rpm (4° C.) for 5 minutes and then the upper layer (plasma) was separated. The separated plasma was stored in an ultra-low temperature freezer (Daihan Science, Korea; MAI-040-03) set at −70° C. before analysis and then used for analysis.

6.4: Test Method 6.4.1 Test Equipment and Reagent

The experimental equipment used in the present invention is as Table 6 below, and the reagent is as Table 7 below.

TABLE 6

| Experiment equipment | Name | Manufacturer |
|---|---|---|
| LC | 1290 Infinity | Agilent, USA |
| MS/MS | 6460 Triple Quadruple | Agilent, USA |
| Centrifuge | Eppendorf Centrifuge 5810R | Eppendorf, USA |
| Ultra pure water system | Basic 361 Series and Ultra 370 Series | Younglin Instrument, Korea |

TABLE 7

| Reagent | Place of acquisition |
|---|---|
| Ropivacaine hydrochloride hydrate (standard material) | Lot No.: 0000077915, Sigma Aldrich, USA |
| Lidocaine hydrochloride hydrate (internal standard material) | Lot No.: WS-054, Joonghun Pharmaceutical, Korea |
| Methanol | Lot No.: 0000110849, J.T. Baker, USA |
| Sodium hydroxide | Lot No.: 110117, Samchun Chemicals, Korea |
| tert-Butyl methyl ether | Lot No.: SHBJ9210, Sigma Aldrich, USA |
| Formic acid | Lot No.: SHBH3180V, Sigma Aldrich, USA |
| Distilled water | Basic 361 Series and Ultra 370 Series, Younglin Instrument, Germany |

LC/MS/MS analysis was progressed using 1290 Infinity (Agilent, USA) as LC equipment and 6460 Triple Quadruple (Agilent, USA) as MS/MS equipment. Ropivacaine hydrochloride monohydrate (Lot No.: 0000077915, Sigma Aldrich, USA) was used as a standard substance, and lidocaine hydrochloride monohydrate (Lot No.: WS-054, Joonghun Pharmaceutical, Korea) was used as an internal standard substance.

6.4.2 Preparation of Standard Solution and Sample

A ropivacaine hydrochloride hydrate standard substance (purity 98.7%) of 0.0500 g was weighed and put in a 50 $m\ell$ bottle, and 50% methanol was filled and then dissolved to prepare 987.000 mg/$\ell$, and then the ropivacaine hydrochloride hydrate standard substance 1.013 $m\ell$ at a concentration of 987.000 mg/$\ell$ was added to a 10 $m\ell$ volumetric flask, and 50% methanol was added up to 10 $m\ell$ mark to prepare a stock solution at a concentration of 100.000 mg/$\ell$, and the prepared stock solution having the concentration and volume of Table 8 below was diluted serially with 50% methanol, and thereby, a working solution having the concentration of Table 8 below was prepared and used.

TABLE 8

| ID | Stock solution concentration (ng/ml) | Stock solution volume (ul) | 50% methanol volume (ul) | Working solution concentration (ng/ml) |
|---|---|---|---|---|
| WS1 | 100 | 400 | 400 | 50 |
| WS2 | 500 | 200 | 800 | 100 |

TABLE 8-continued

| ID | Stock solution concentration (ng/ml) | Stock solution volume (ul) | 50% methanol volume (ul) | Working solution concentration (ng/ml) |
|---|---|---|---|---|
| WS3 | 1,000 | 500 | 500 | 500 |
| WS4 | 2,000 | 500 | 500 | 1,000 |
| WS5 | 5,000 | 400 | 600 | 2,000 |
| WS6 | 10,000 | 500 | 500 | 5,000 |
| WS7 | 100,000 | 100 | 900 | 10,000 |

A lidocaine hydrochloride hydrate (purity 100.0%) of 0.05 g was weighed and put in a 50 mg/ℓ bottle, and 50% methanol was filled and then dissolved to prepare 1,000.000 mg/ℓ, and then the lidocaine hydrochloride hydrate standard substance 1 mℓ at a concentration of 1,000.000 mg/ℓ was added to a 10 mℓ volumetric flask, and 50% methanol was added up to 10 mℓ mark to prepare a stock solution at a concentration of 10.000 mg/ℓ, and the prepared stock solution 60 µℓ and acetonitrile 9,940 µℓ were mixed to prepare a working solution of 600 ng/mℓ.

The stock solution of the stock solution standard solution was used, and the stock solution of the prepared standard solution having the concentration and volume of Table 9 below was diluted serially with 50% methanol, and thereby, a working solution having the concentration of Table 9 below was prepared and used.

TABLE 9

| ID | Stock solution concentration (ng/ml) | Stock solution volume (ul) | 50% methanol volume (ul) | Working solution concentration (ng/ml) |
|---|---|---|---|---|
| WS7 | 5,000 | 30 | 970 | 150 |
| WS8 | 8,000 | 625 | 375 | 5,000 |
| WS9 | 100,000 | 80 | 920 | 8,000 |

The plasma stored at 70° C. or less was dissolved by standing at a room temperature, and then mixed well in a vortex for about 30 seconds. The working solution having the concentration and volume of Table 10 below was diluted serially with the plasma and the working solution of the standard solution was prepared by preparing standard plasma of the calibration curve sample having the concentration of Table 10 below.

TABLE 10

| ID | Working solution concentration (ng/ml) | Working solution volume (ul) | Plasma volume (ul) | Lidocaine concentration in plasma (ng/ml) |
|---|---|---|---|---|
| S1 | 50 | 40 | 360 | 5 |
| S2 | 100 | 40 | 360 | 10 |
| S3 | 500 | 40 | 360 | 50 |
| S4 | 1,000 | 40 | 360 | 100 |
| S5 | 2,000 | 40 | 360 | 200 |
| S6 | 5,000 | 40 | 360 | 500 |
| S7 | 10,000 | 40 | 360 | 1,000 |

6.4.3 Pretreatment of Sample

After adding internal standard solution 40 µℓ at a concentration of 600.000 ng/mℓ, 1M Sodium hydroxide 40 µℓ and tert-Butyl methyl ether 1,200 µℓ to the calibration curve sample and biological sample 200 µℓ, they were under vortex mixing for 30 seconds and then centrifuged at 3,400 rpm for 5 minutes to collect the supernatant of 900 µℓ.

To this supernatant 900 µℓ, 0.1% formic acid 90 µℓ was added, and then they were under vortex mixing for 30 seconds and then centrifuged at 3,400 rpm for 5 minutes to collect the lower layer 80 µℓ.

6.4.4 Analysis Condition and Quantification Method and Result Interpretation

Hereinafter, the specific LC/MS/MS condition used in the present invention is as Table 11 below.

TABLE 11

| Column | Union UK-Silica (150 X 2 µm, ID 3 Micron, Imtakt, USA) |
|---|---|
| Column temperature | 40° C. |
| Mobile phase | 2% Formic acid in Acetonitrile: D.W. = 50:50 |
| Autosampler temperature | Room temperature |
| Flow rate | 0.3 µl/min |
| Injection volume | 5 µl |

| | Cation mode, MRM mode Nebulizing gas: $N_2$ | | | |
|---|---|---|---|---|
| | Compound | m/z | Collision energy (V) | Fragmentor |
| Detector (MS/MS) | Ropivacaine hydrochloride hydrate | 275.3 → 126.2 | 20 | 120 |
| | | 275.3 → 84.2 | 50 | 120 |
| | Lidocaine hydrochloride hydrate | 235.2 → 86.1 | 20 | 80 |
| | | 235.2 → 58.1 | 40 | 80 |

For quantitative values, the peak area ratio of the standard substance to the peak area of the internal standard substance (peak area of standard substance/peak area of internal standard substance) was obtained from the obtained chromatogram. The concentration of the test substance in plasma was calculated from the pre-prepared calibration curve using MassHunter Workstation Software, version B.07.1 (Agilent, USA) of the corresponding equipment.

Toxicokinetic result interpretation was performed by calculating kinetic parameters of Tmax (time to reach maximum blood concentration), Cmax (maximum blood concentration), $AUC_{0-48\ hr}$ (area under blood concentration-time curve of 0 to 48 times) and MRT (average residence time of drug) using Phoenix™ WinNonlin by a non-model interpretation method based on a blood concentration curve.

6.5: Analysis Result of Blood Ropivacaine Concentration Change

In all test groups, the drug concentration of ropivacaine showed a tendency to increase rapidly 1 to 2 hours after drug administration and then to decrease sharply up to 6 hours, and all the drug was lost at 12 hours, and the result was shown in FIG. 11 and Table 12. The ropivacaine concentration of plasma collected before and at 0.5, 1, 2, 4, 6, 8, 12, 24 and 48 hours after administration of the test substance of each animal of the Ge to Gg groups was measured, and the average of the concentration of each test group was calculated. In Table 12 below, the average of the ropivacaine concentration (ng/kg) in plasma of Rat measured over time was shown.

TABLE 12

| Hour (Hr) | Ge | Gf | Gg |
|---|---|---|---|
| 0 | 0 | 0 | 0 |
| 0.5 | 361.54 | 293.02 | 241.94 |
| 1 | 429.62 | 327.58 | 311.45 |

TABLE 12-continued

| Hour (Hr) | Ge | Gf | Gg |
|---|---|---|---|
| 2 | 384.59 | 409.23 | 252.82 |
| 4 | 68.46 | 127.13 | 81.74 |
| 6 | 18.86 | 22.3 | 19.93 |
| 8 | 5.92 | 4.69 | 12.69 |
| 12 | 1.66 | 1.23 | 1.8 |
| 24 | 0.97 | 0.8 | 0.87 |
| 48 | 0.8 | 0.8 | 0.8 |

6.6: Ropivacaine Pharmacokinetic Parameter Analysis Result

The pharmacokinetic parameters of ropivacaine in plasma were analyzed based on the concentration in blood after drug administration over time, and the analysis result was shown in FIG. 12 and Table 13 below. The parameter values of each animal of the Ge to Gg group test groups were measured, and the average of each parameter of each test group was calculated. The average of the parameters analyzed in Table 13 below was shown.

TABLE 13

| Animal number | $AUC_{0-48\ hr}$ (ng · hr/mℓ) | Cmax (ng/mℓ) | Tmax (hr) | MRT (hr) |
|---|---|---|---|---|
| Ge | 1254.97 | 439.90 | 1.20 | 1.86 |
| Gf | 1308.39 | 409.23 | 2.00 | 2.17 |
| Gg | 947.86 | 320.41 | 1.20 | 2.15 |

In the Ge group, the $AUC_{0-48\ hr}$ average was shown as 1254.97 ng·h/mℓ, and the Cmax average was 439.90 ng/mℓ, and the Tmax average was 1.2 hr, and the MRT average was 1.86 hr.

In the Gf group, the $AUC_{0-48\ hr}$ average was shown as 1308.39 ng·h/mℓ, and the Cmax average was 409.23 ng/mℓ, and the Tmax average was 2 hr, and the MRT average was 2.17 hr.

In the Gg group, the $AUC_{0-48\ hr}$ average was shown as 947.86 ng·h/mℓ, and the Cmax average was 320.41 ng/mℓ, and the Tmax average was 1.2 hr, and the MRT average was 2.15 hr.

As the result of comparing the Ge and Gf for comparing the pharmacokinetic change of the physiological saline solution (0.9% sodium chloride) mixed administration group and Voferon-L60 mixed administration group, it was determined that the $AUC_{0-48\ hr}$ average was same and the Tmax and MRT were increased in the Voferon-L60 mixed administration group, and the Cmax was increased in the physiological saline solution mixed administration group. Such result is determined to be the result of delayed drug release in case of the Voferon-L60 mixture, although the bioavailability is same.

As the result of comparing the Gf and Gf for pharmacokinetic comparison by the ropivacaine concentration change according to the dilution ratio of Voferon-L60, reduction in the $AUC_{0-48\ hr}$, Cmax and Tmax was observed according to the concentration change, and there was no change in MRT. Such result is the result due to delayed drug release in case of the Voferon-L60 mixture, although the bioavailability is same.

As the result of comparing the Ge and Gf with Gg for comparing the ropivacaine concentration pharmacokinetic change of the mixed administration group, reduction in the $AUC_{0-48\ hr}$, Tmax and Cmax was observed, and there was no change in MRT. Such result is determined to be a decrease of the $AUC_{0-48\ hr}$, Tmax and Cmax according to the decrease in the ropivacaine concentration, and it is determined that there is no effect on the average residence time as the drug release is delayed due to the effect according to the increase in the concentration of Voferon-L60. Therefore, it is determined that the drug release will be delayed as the concentration of Voferon-L60 increases.

Based on the above results, it is determined that the injection solution used for the surgical product (Voferon-L60) delays the drug release of ropivacaine, and it is determined that the drug release is delayed according to the increase of the Voferon-L60 concentration. In addition, the low Cmax value in blood in the test group, Gf and Gg group compared to the control group (Ge) is determined to be safer than when using ropivacaine alone, as the drug release is delayed due to the effect according to the increase of the concentration of Voferon-L60.

The invention claimed is:

1. A drug delivery composition comprising two kinds of crosslinked hyaluronic acid gels having different swelling ratios,
wherein the hyaluronic acid gels having different swelling ratios have a difference in the swelling ratio of 100% to 500%, and comprise a first crosslinked hyaluronic acid gel having a low swelling ratio and a second crosslinked hyaluronic acid gel having a high swelling ratio,
wherein the first crosslinked hyaluronic acid gel comprises a first crosslinked hyaluronic acid prepared by a process comprising performing a crosslinking reaction at a reaction volume of 100 to 800 mL and pre-crushing through a sieve having a pore diameter of 500 to 2,000 μm, the first crosslinked hyaluronic acid having a solids content of 2.0% by weight or less,
wherein the second crosslinked hyaluronic acid gel comprises a second crosslinked hyaluronic acid prepared by a process comprising performing a crosslinking reaction at a reaction volume of 3 to 50 mL and omitting any pre-crushing step, the second crosslinked hyaluronic acid having a solids content of 2.5% by weight or more, wherein the hyaluronic acid in the gels is crosslinked by at least one crosslinking agent selected from the group consisting of butandiol diglycidyl ether (1,4-butandiol diglycidyl ether: BDDE), ethylene glycol diglycidyl ether (EGDGE), hexanediol diglycidyl ether (1,6-hexanediol diglycidyl ether), propylene glycol diglycidyl ether, polypropylene glycol diglycidyl ether, polytetramethylene glycol diglycidyl ether, neopentyl glycol diglycidyl ether, polyglycerol polyglycidyl ether, diglycerol polyglycidyl ether, glycerol polyglycidyl ether, tri-methylpropane polyglycidyl ether, bisepoxypropoxyethylene (1,2-(bis(2,3-epoxypropoxy)ethylene), pentaerythritol polyglycidyl ether, sorbitol polyglycidyl ether, and 1,4-butanedioldiglycidylether,
wherein the crosslinked hyaluronic acid gel has a degree of crosslinking of 0.1 to 5 mol %, and
wherein the drug delivery composition has a complex viscosity of 500,000 to 1,500,000 cp as measured at 0.02 Hz and a modulus of elasticity of 150 to 250 pa as measured at 1 Hz for a drug delivery composition sample with a solid content of 2% by weight wherein the drug is at least an anesthetic selected from the group consisting of ropivacaine, bupivacaine, chlorprocaine, lidocaine, mepivacaine, procaine, tetracaine, levobupivacaine and articaine.

2. The drug delivery composition according to claim 1, wherein the drug is a local anesthetic, and wherein the drug delivery composition has a release pattern of the cumulative amount of the drug release of 55 to 75% by weight for 24 hours, 70 to 90% by weight for 48 hours and 90% by weight or more for 72 hours, and the cumulative amount of the drug release for 48 is 5% by weight or higher than the cumulative amount of the drug release for 24 hours.

3. The composition according to claim 1, wherein the drug delivery composition has a swelling ratio of 100 to 250%.

4. The composition according to claim 1, wherein the first crosslinked hyaluronic acid gel has a swelling ratio of 50 to 175%, and the second crosslinked hyaluronic acid gel has a swelling ratio of 150 to 675%.

5. The composition according to claim 1, wherein the mixing weight ratio of the first crosslinked hyaluronic acid gel and the second crosslinked hyaluronic acid gel is 3:1 to 1:3.

6. The composition according to claim 1, wherein the crosslinked hyaluronic acid gel having different swelling ratios is obtained by crosslinking reaction using a hyaluronic acid within a range of a molecular weight of 1,000 kDa to 2,000 kDa and a crosslinking agent of 0.3 to 1.3 mol %.

7. The composition according to claim 1, wherein the solid content of the crosslinked hyaluronic acid is 40 to 90% by weight and the content of the drug is 10 to 60% by weight, based on 100% by weight of the total solid content of the crosslinked hyaluronic acid and drug.

\* \* \* \* \*